United States Patent
Yamazaki

(10) Patent No.: US 8,885,209 B2
(45) Date of Patent: Nov. 11, 2014

(54) PRINTER CONTROL DEVICE, METHOD AND COMPUTER-READABLE STORAGE MEDIUM FOR CONTROLLING PROXY PRINTING USING LOW POWER AT LOW PRINT SPEED

(71) Applicant: Konica Minolta, Inc., Chiyoda-ku (JP)

(72) Inventor: Shohei Yamazaki, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 43 days.

(21) Appl. No.: 13/869,119

(22) Filed: Apr. 24, 2013

(65) Prior Publication Data

US 2013/0301062 A1 Nov. 14, 2013

(30) Foreign Application Priority Data

May 8, 2012 (JP) ................................ 2012-106397

(51) Int. Cl.
*G06K 15/00* (2006.01)
*G06F 3/12* (2006.01)
*G06K 15/02* (2006.01)

(52) U.S. Cl.
CPC .............. *G06K 15/4055* (2013.01); *G06F 3/12* (2013.01); *G06K 15/1859* (2013.01); *G06K 15/40* (2013.01)

USPC ........................... 358/1.5; 358/1.14; 358/1.15

(58) Field of Classification Search
CPC .... G06K 15/10; G06K 15/22; G06K 15/4055
See application file for complete search history.

(56) References Cited

U.S. PATENT DOCUMENTS

2006/0250638 A1* 11/2006 Wang et al. .................. 358/1.15
2009/0284791 A1* 11/2009 Osada .......................... 358/1.15
2012/0050792 A1* 3/2012 Uozumi ....................... 358/1.15

FOREIGN PATENT DOCUMENTS

JP 2000-259378 A 9/2000
JP 2011-51144 A 3/2011

* cited by examiner

*Primary Examiner* — Benny Q Tieu
*Assistant Examiner* — Haris Sabah
(74) *Attorney, Agent, or Firm* — Buchanan Ingersoll & Rooney PC

(57) ABSTRACT

A printer control device for performing control such that a second printer serves as a proxy to execute a print job to be executed by a first printer is provided. The printer control device includes a speed determination portion configured to determine whether or not a second speed is higher than a first speed, the second speed being a print speed set in the second printer, the first speed being a print speed set in the first printer; and a control unit configured to control, when the speed determination portion determines that the second speed is higher than the first speed, the second printer to execute the print job at a third speed lower than the second speed.

15 Claims, 27 Drawing Sheets

FIG. 22A

IMAGE FORMING APPARATUS 2A

| MODE | PRINT SPEED | PREPARATION REQUIRED TIME | AMOUNT OF PREPARATION POWER | AMOUNT OF PRINTING POWER |
|---|---|---|---|---|
| LOW-SPEED PRINTING MODE | 10ppm | 10SEC. | 4.2Wh | 0.45Wh |
| HIGH-SPEED PRINTING MODE | 30ppm | 14SEC. | 5.8Wh | 0.40Wh |

FIG. 22B

IMAGE FORMING APPARATUS 2B

| MODE | PRINT SPEED | PREPARATION REQUIRED TIME | AMOUNT OF PREPARATION POWER | AMOUNT OF PRINTING POWER |
|---|---|---|---|---|
| LOW-SPEED PRINTING MODE | 30ppm | 14SEC. | 5.8Wh | 0.40Wh |
| HIGH-SPEED PRINTING MODE | 60ppm | 20SEC. | 8.3Wh | 0.35Wh |

FIG. 23

| THE NUMBER OF PRINTS | TOTAL REQUIRED TIME | | TOTAL AMOUNT OF POWER CONSUMPTION | |
|---|---|---|---|---|
| | LOW-SPEED (30ppm) | HIGH-SPEED (60ppm) | LOW-SPEED (30ppm) | HIGH-SPEED (60ppm) |
| 40 SHEETS | 94SEC. | 60SEC. | 21.8Wh | 22.3Wh |
| ⋮ | ⋮ | ⋮ | ⋮ | ⋮ |
| 55 SHEETS | 124SEC. | 70SEC. | 27.8Wh | 27.6Wh |

FIG. 25

| MODE | PRINT SPEED | PREPARATION REQUIRED TIME | AMOUNT OF PREPARATION POWER | AMOUNT OF PRINTING POWER |
| --- | --- | --- | --- | --- |
| LOW-SPEED PRINTING MODE | 10ppm | 10SEC. | 4.2Wh | 0.45Wh |
| MIDDLE-SPEED PRINTING MODE | 30ppm | 14SEC. | 5.8Wh | 0.40Wh |
| HIGH-SPEED PRINTING MODE | 60ppm | 20SEC. | 8.3Wh | 0.35Wh |

FIG. 26

| THE NUMBER OF PRINTS | REQUIRED TIME | | | TOTAL AMOUNT OF REQUIRED POWER | | |
|---|---|---|---|---|---|---|
| | LOW-SPEED(10ppm) | MIDDLE-SPEED(30ppm) | HIGH-SPEED(60ppm) | LOW-SPEED(10ppm) | MIDDLE-SPEED(30ppm) | HIGH-SPEED(60ppm) |
| 2 SHEETS | 22SEC. | 18SEC. | 22SEC. | 5.10Wh | 6.70Wh | 9.00Wh |
| 5 SHEETS | 40SEC. | 24SEC. | 25SEC. | 6.45Wh | 7.80Wh | 10.05Wh |
| 40 SHEETS | 250SEC. | 94SEC. | 60SEC. | 22.20Wh | 21.80Wh | 22.30Wh |
| 55 SHEETS | 340SEC. | 124SEC. | 70SEC. | 28.95Wh | 27.80Wh | 27.55Wh |

PRINTER CONTROL DEVICE, METHOD AND COMPUTER-READABLE STORAGE MEDIUM FOR CONTROLLING PROXY PRINTING USING LOW POWER AT LOW PRINT SPEED

This application is based on Japanese patent application No. 2012-106397 filed on May 8, 2012, the contents of which are hereby incorporated by reference.

BACKGROUND OF THE INVENTION

1. Field of the Invention

The present invention relates to a technology for determining whether or not a speed for printing should be changed.

2. Description of the Related Art

In recent years, image forming apparatuses called "Multi-Functional Peripherals (MFPs)", "multifunction devices", or the like have been provided with a network function. Along with this trend, such an image forming apparatus comes to be connected to a corporate intranet, and to be used together with other devices such as a server and terminals.

A plurality of image forming apparatuses comes to be used in an intranet. In such a case, it has become possible to cause an image forming apparatus arbitrarily selected by a user from among the image forming apparatuses to print an image.

In the meantime, a method has been proposed for determining a device used to output an image. According to the method, if an image output device of high priority order is unable to output an image due to the occurrence of some sort of trouble, a server automatically transfers output information to another network printer (Japanese Laid-open Patent Publication No. 2000-259378).

In recent years, the print speed of a printer of an image forming apparatus has become higher and higher. As the print speed is higher, a heat roller and the like are required to have a higher temperature in order to fix toner onto paper. If the heat roller has a higher temperature, more power is required to keep the temperature thereof high.

In light of recent environmental issues, printers are urged to operate in a manner to reduce their electric consumption. As described in Japanese Laid-open Patent Publication No. 2000-259378, when some sort of trouble occurs in a certain image output device, and thus, another image output device acts as a proxy to perform printing for the certain image output device, proper power saving is also urged.

SUMMARY

The present invention has been achieved in light of such an issue, and an object thereof is to reduce power consumed in a printer which serves as a proxy to perform printing for another device.

A printer control device according to one aspect of the present invention is a printer control device for performing control such that a second printer serves as a proxy to execute a print job to be executed by a first printer. The printer control device includes a speed determination portion configured to determine whether or not a second speed is higher than a first speed, the second speed being a print speed set in the second printer, the first speed being a print speed set in the first printer; and a control unit configured to control, when the speed determination portion determines that the second speed is higher than the first speed, the second printer to execute the print job at a third speed lower than the second speed.

Preferably, the control unit controls the second printer to execute the print job at the third speed when low-speed printing power consumption is smaller than high-speed printing power consumption, the low-speed printing power consumption being an amount of power to be consumed for a case where the second printer executes the print job at the third speed, the high-speed printing power consumption being an amount of power to be consumed for a case where the second printer executes the print job at the second speed.

Preferably, the high-speed printing power consumption includes an amount of power consumed in order to prepare for conditions under which the second printer performs printing at the second speed, and an amount of power calculated by multiplying an amount of power consumed for the second printer to perform printing on a sheet of paper at the second speed and the number of prints together, and the low-speed printing power consumption includes an amount of power consumed in order to prepare for conditions under which the second printer performs printing at the third speed, and an amount of power calculated by multiplying an amount of power consumed for the second printer to perform printing on a sheet of paper at the third speed and the number of prints together.

Preferably, when there is a plurality of settable speeds that can be set as the third speed in the second printer, the control unit calculates the low-speed printing power consumption for each of the plurality of settable speeds, and controls the second printer to execute the print job by applying, as the third speed, a settable speed of the plurality of settable speeds having a lowest low-speed printing power consumption.

These and other characteristics and objects of the present invention will become more apparent by the following descriptions of preferred embodiments with reference to drawings.

BRIEF DESCRIPTION OF THE DRAWINGS

FIGS. 22A and 22B are diagrams showing an example of the specifications of image forming apparatuses.

FIG. 23 is a diagram showing an example of the total time and the total amount of power required for a print job to be executed depending on the number of prints.

FIG. 25 is a diagram showing a variation of the specifications of an image forming apparatus.

FIG. 26 is a diagram showing an example of the total time and the total amount of power required for a print job to be executed depending on the number of prints.

DESCRIPTION OF THE PREFERRED EMBODIMENTS

[First Embodiment]

Figure 1:
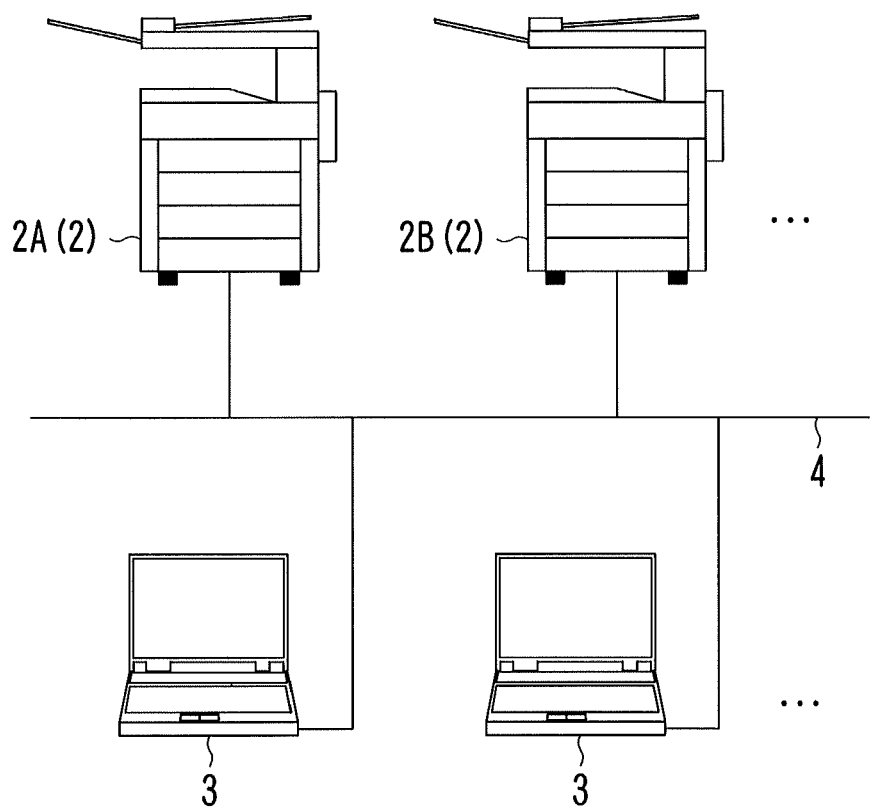
FIG. 1 is a diagram showing an example of the overall configuration of a network printing system.
Figure 2:
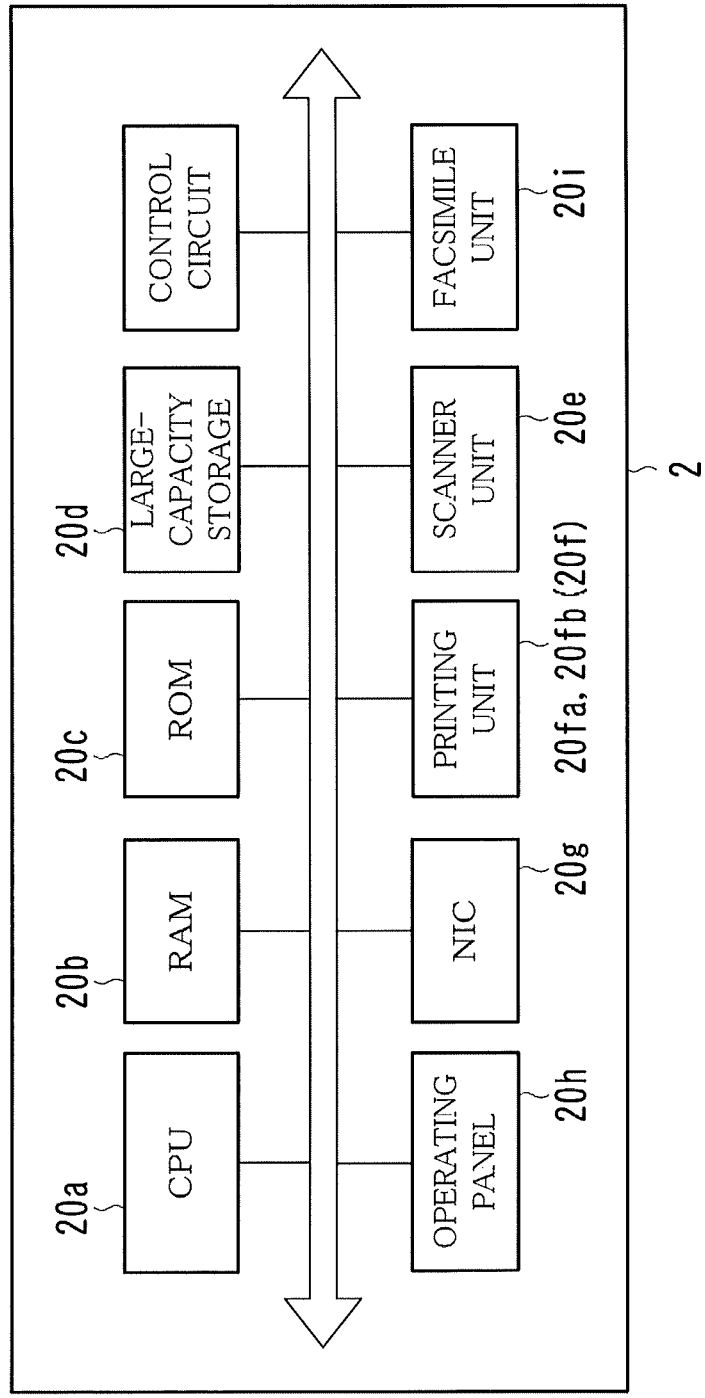
FIG. 2 is a diagram showing an example of the hardware configuration of an image forming apparatus.
Figure 3:
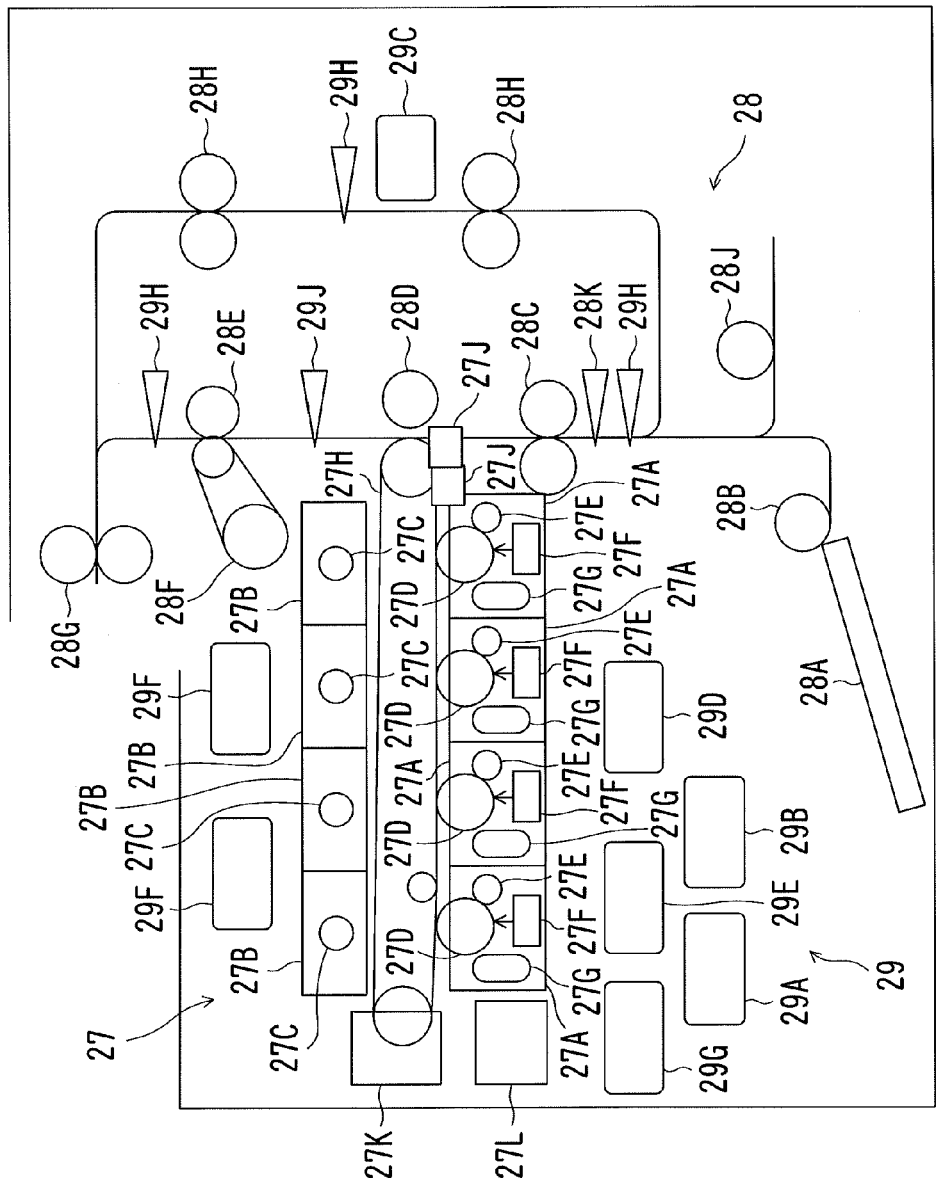
FIG. 3 is a schematic diagram showing an example of the structure of a printing unit.
Figure 4:
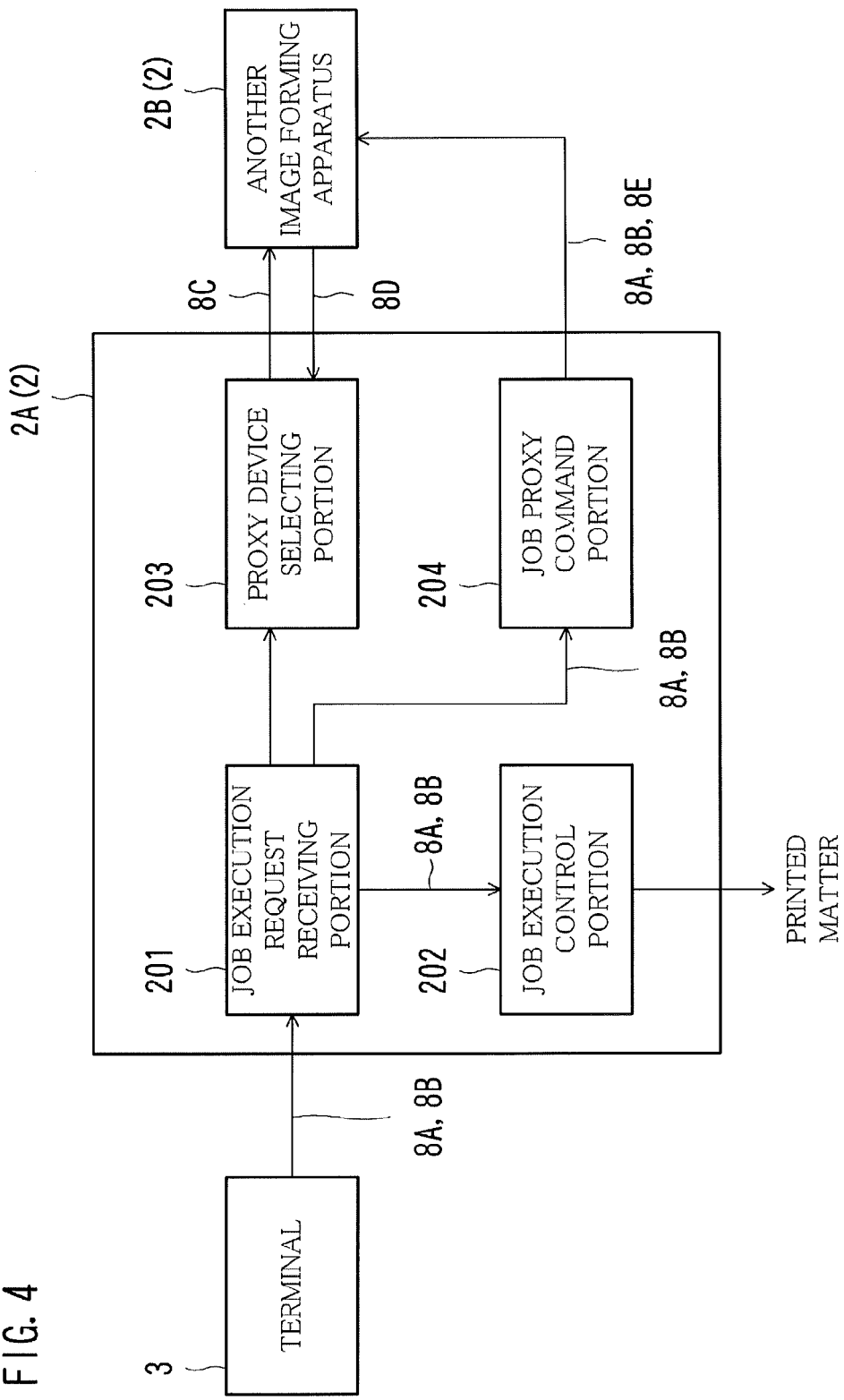
FIG. 4 is a diagram showing an example of the functional configuration implemented by first print job execution software in an image forming apparatus.
Figure 5:
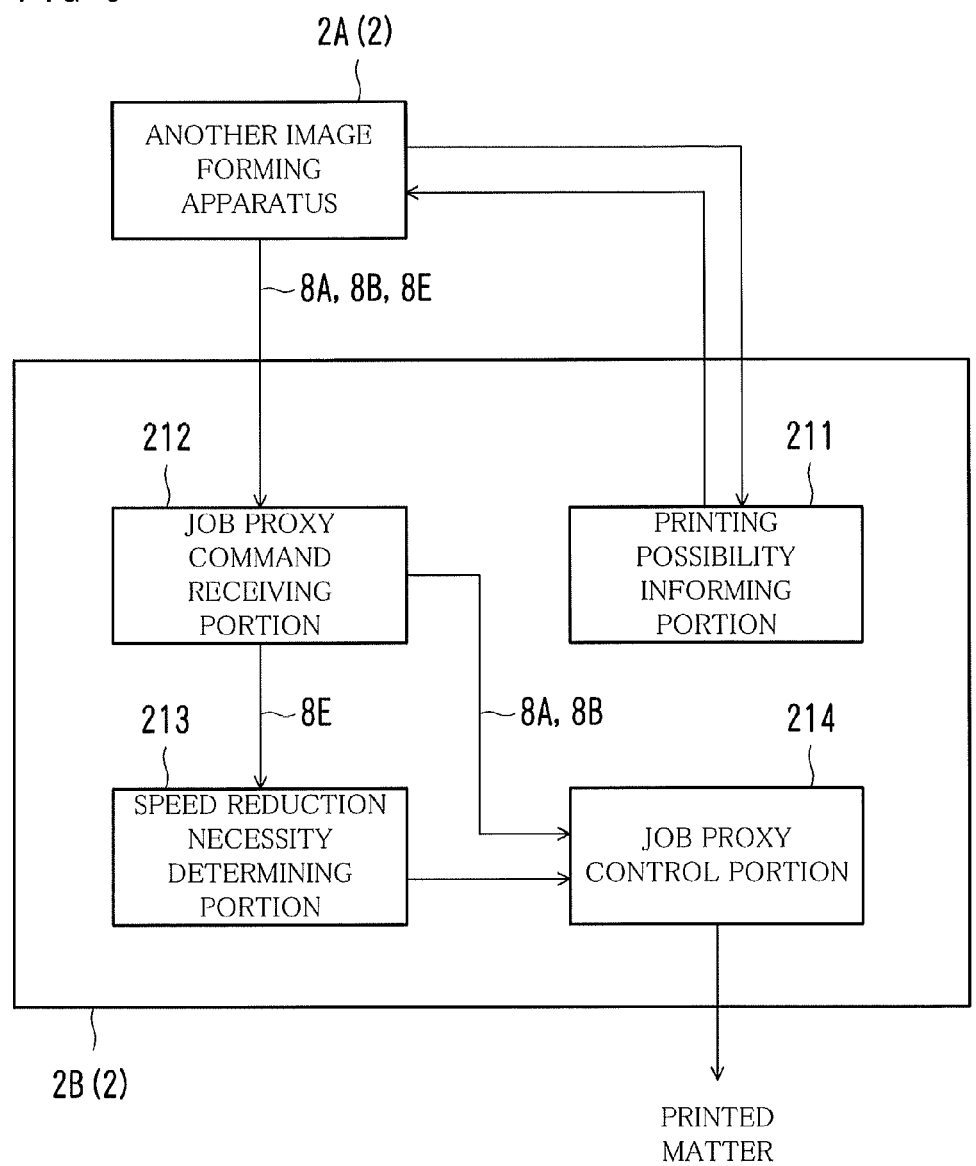
FIG. 5 is a diagram showing an example of the functional configuration implemented by first print job proxy software in an image forming apparatus.
Figure 6:
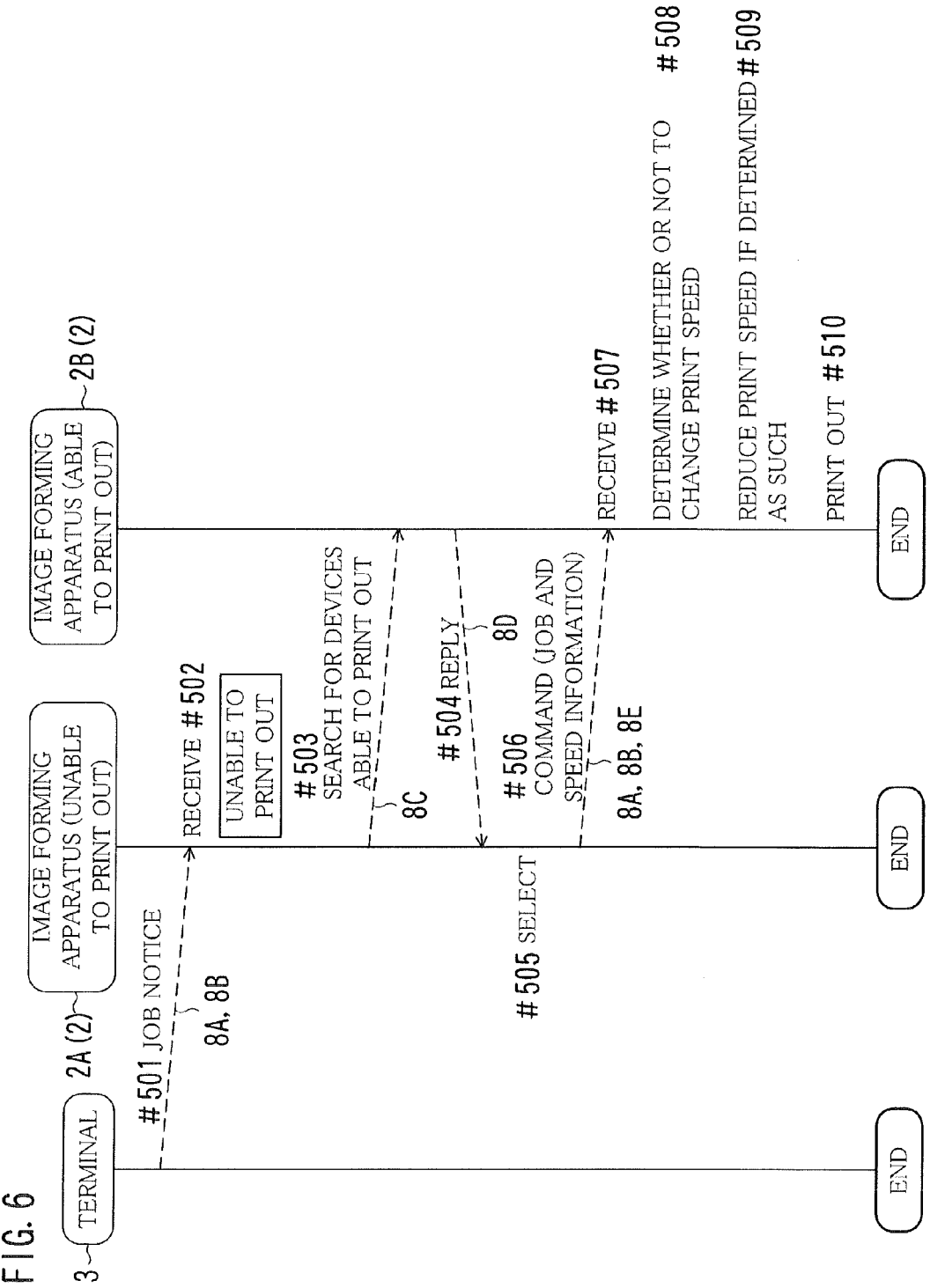
FIG. 6 is a sequence diagram showing an example of the flow of processing performed by devices in a first embodiment.

FIG. 1 is a diagram showing an example of the overall configuration of a network printing system 100; FIG. 2 is a diagram showing an example of the hardware configuration of an image forming apparatus 2; FIG. 3 is a schematic diagram showing an example of the structure of a printing unit 20f; FIG. 4 is a diagram showing an example of the functional configuration implemented by first print job execution software in the image forming apparatus 2; FIG. 5 is a diagram showing an example of the functional configuration implemented by first print job proxy software in the image forming apparatus 2; and FIG. 6 is a sequence diagram showing an example of the flow of processing performed by devices in the first embodiment.

Referring to FIG. 1, the network printing system 100 is configured of a plurality of image forming apparatuses 2, at least one terminal 3, a communication line 4, and so on.

The devices of the network printing system 100 are configured to perform communication with one another via the communication line 4. Examples of the communication line 4 are a Local Area Network (LAN), a dedicated line, and a public line.

The image forming apparatus 2 is an apparatus that is generally called a "Multi-Functional Peripheral (MFP)" or a "multifunction device". The image forming apparatus 2 is an apparatus into which various functions such as copying, PC printing, faxing, and scanning are consolidated.

The PC print function is a function to print an image onto paper based on image data received from the terminal 3. The PC print function is sometimes called a "network printer function" or "network printing function".

Referring to FIG. 2, the image forming apparatus 2 is configured of a Central Processing Unit (CPU) 20a, a Random Access Memory (RAM) 20b, a Read Only Memory (ROM) 20c, a large-capacity storage 20d, a scanner unit 20e, the printing unit 20f, a Network Interface Card (NIC) 20g, an operating panel 20h, a facsimile unit 20i, a variety of types of control circuits, and so on.

The NIC 20g performs communication with a remote management device 1 and the terminal 3 via the communication line 4 in accordance with a protocol such as Transmission Control Protocol/Internet Protocol (TCP/IP).

The operating panel 20h is configured of a key entry portion, a touch-sensitive panel display, and so on. The key entry portion is a so-called hardware keyboard, and includes a numeric keypad, a start key, a stop key, and a function key. The touch-sensitive panel display displays, for example, a screen for presenting messages or instructions to a user, a screen for allowing a user to input desired processing types and conditions, and a screen showing the results of processing performed by the CPU 20a. A user operates the key entry portion or the touch-sensitive panel display while viewing the screens, which allows the user to input information and commands to the image forming apparatus 2.

The scanner unit 20e serves to read out an image recorded on a sheet of paper placed on a document glass, and to generate image data thereof.

The facsimile unit 20i sends and receives image data with a facsimile terminal via a public telephone line in accordance with a protocol such as G3.

The printing unit 20f serves to print, onto a recording medium such as paper, an image read out by the scanner unit 20e and an image indicated in image data sent by the terminal 3 or a fax terminal. An example is described below in which a color electrophotographic print engine assembled in tandem is used as the printing unit 20f as shown in FIG. 3.

The printing unit 20f is primarily provided with an imaging portion 27, a transfer portion 28, and a drive portion 29.

The imaging portion 27 is provided with cartridges 27A, toner bottles 27B, mixing blades 27C, photoconductors 27D, chargers 27E, light exposure devices 27F, developer units 27G, an intermediate transfer belt 27H, density detection sensors 27J, an intermediate transfer belt cleaning mechanism 27K, a waste toner container 27L, and so on. The individual parts of the imaging portion 27 serve to form an image to be printed onto a recording medium in the following manner.

A set of the parts from the cartridge 27A through the developer unit 27G is provided for each of colors of cyan, magenta, yellow, and black. The following description takes an example of the cartridge 27A through the developer unit 27G for cyan.

The cartridge 27A contains, therein, cyan toner and carrier that are mixed at a predetermined ratio. The toner bottle 27B contains, therein, cyan toner for replacement. The mixing blade 27C replenishes the cartridge 27A with the cyan toner contained in the toner bottle 27B.

The charger 27E serves to charge the photoconductor 27D. The light exposure device 27F performs exposure depending on a print target image to form an electrostatic latent image for cyan on the photoconductor 27D.

The developer unit 27G applies the cyan toner contained in the cartridge 27A onto the photoconductor 27D, so that a toner image for cyan is formed on the photoconductor 27D.

The sets of the parts from the cartridge 27A through the developer unit 27G for magenta, yellow, and black play the same role as that for cyan. Consequently, toner images for magenta, yellow, and black are formed on the photoconductor 27D.

The toner images for cyan, magenta, yellow, and black are superimposed on the intermediate transfer belt 27H.

The density detection sensors 27J are provided in a manner to face the intermediate transfer belt 27H in a downstream from the four cartridges 27A. The density detection sensors 27J serve to detect the density of a toner image formed on the intermediate transfer belt 27H. An arrangement is possible in which the two density detection sensors 27J are provided along the width direction of the intermediate transfer belt 27H. Another arrangement is also possible in which only one density detection sensor 27J is provided therealong. The result of the detection is used for control of the toner replenishment. The intermediate transfer belt cleaning mechanism 27K and the waste toner container 27L are described later.

The transfer portion 28 is provided with a recording medium tray 28A, a paper feed roller 28B, a timing roller 28C, a secondary transfer roller 28D, a heat roller 28E, a pressure roller 28F, a paper output roller 28G, duplex printing path paper feed rollers 28H, a manual paper feed roller 28J, a paper material detection sensor 28K, and so on. The individual parts of the transfer portion 28 serve to deliver a recording medium and to fix a toner image on the recording medium as discussed below.

The recording medium tray 28A contains, therein, blank recording media. The paper feed roller 28B supplies the recording media one by one from the recording medium tray 28A to the timing roller 28C.

For manual paper feed, the manual paper feed roller 28J supplies a recording medium placed on a manual feed tray to the timing roller 28C.

The paper material detection sensor 28K detects a material of the recording medium sent by the paper feed roller 28B or the manual paper feed roller 28J. The result of the detection is used for control of transfer and fixing of a toner image onto a sheet of paper.

The timing roller 28C temporarily stops the recording medium supplied by the paper feed roller 28B or the manual paper feed roller 28J. The timing roller 28C then sends the recording medium to the secondary transfer roller 28D at a predetermined time.

The secondary transfer roller 28D transfers the toner image superimposed on the intermediate transfer belt 27H to the recording medium supplied by the timing roller 28C.

The heat roller 28E applies heat to the recording medium onto which the toner image has been transferred. The pressure roller 28F pressurizes the recording medium onto which the toner image has been transferred. This fixes the toner image onto the recording medium. Each of the heat roller 28E and the pressure roller 28F is generally called a "fixing roller". The heat roller 28E applies heat not only to the recording medium but also to the entirety of the printing unit 20f.

The paper output roller 28G sends the recording medium onto which the toner image has been fixed to a paper output unit. For duplex printing, the paper output roller 28G reverses the recording medium (goes the recording medium backward) once and supplies the recording medium to a path for duplex printing (duplex printing paper feed path).

The duplex printing paper feed path has two duplex printing path paper feed rollers 28H which serve to supply the approaching recording medium to the timing roller 28C via the duplex printing paper feed path.

The intermediate transfer belt cleaning mechanism 27K of the imaging portion 27 removes, from the intermediate transfer belt 27H, the toner that remains thereon without being transferred to the recording medium. The removed toner is accumulated in the waste toner container 27L.

The drive portion 29 is provided with a main motor 29A, a fixing motor 29B, a duplex printing paper feed motor 29C, a monochrome development motor 29D, a color development motor 29E, toner replenishment motors 29F, a cleaner brush motor 29G, paper detection sensors 29H, and so on. The drive portion 29 serves to drive the individual elements of the imaging portion 27 and the transfer portion 28 as discussed below.

The paper detection sensors 29H are provided at predetermined positions of a path on which the recording medium is carried. The paper detection sensors 29H serve to detect that the recording medium has reached the predetermined positions. The motors described below operate depending on, for example, the result of detection by the paper detection sensors 29.

The main motor 29A drives the photoconductor 27D, the intermediate transfer belt 27H, the timing roller 28C, and the secondary transfer roller 28D. In another arrangement, the intermediate transfer belt 27H may be driven by a motor used only therefor.

The fixing motor 29B drives the heat roller 28E, the pressure roller 28F, and the paper output roller 28G.

The duplex printing paper feed motor 29C drives the duplex printing path paper feed rollers 28H. The cleaner brush motor 29G drives the intermediate transfer belt cleaning mechanism 27K.

The monochrome development motor 29D drives the developer unit 27G for black. The color development motor 29E drives the developer units 27G for cyan, magenta, and yellow. For full-color printing, both the monochrome development motor 29D and the color development motor 29E drive the developer units 27G. For monochrome printing, the monochrome development motor 29D drives the developer unit 27G for black while the color development motor 29E does not drive the developer units 27G for cyan, magenta, and yellow. In this way, the reduction in unnecessary rotation leads to the reduction in friction on the toner contained in the developer units 27G. Instead of this, another configuration is possible in which only the developer unit 27G for black is driven or the developer units 27G for all the four colors are driven by switching between the normal rotation and the reverse rotation of one development motor.

The toner replenishment motor 29F drives, for example, the mixing blade 27C in such a manner that the toner is supplied from the toner bottle 27B to the cartridge 27A. The toner replenishment motor 29F may be provided for each color. Alternatively, the toner replenishment motor 29F may be commonly used for a plurality of colors. For example, it is possible that two toner replenishment motors 29F are provided, one of the toner replenishment motors 29F is used for cyan and magenta, and the other is used for yellow and black.

In the meantime, the speed for printing (print speed) of the printing unit 20f can be changed. It is supposed that, in this embodiment, the print speed is represented based on how many sheets of the recording medium having a predetermined size (A4 size, for example) are to be printed during one minute. The printing unit 20f has two modes for printing, one is a high-speed printing mode, and the other is a low-speed printing mode. Hereinafter, in order to distinguish the printing units 20f of the image forming apparatuses 2A and 2B from each other, the former is sometimes referred to as a "printing unit 20fa" and the latter is sometimes referred to as a "printing unit 20fb".

Referring back to FIG. 2, the ROM 20c or the large-capacity storage 20d stores, therein, first print job execution software, first print job proxy software, and so on. Modules of the pieces of software are loaded into the RAM 20b as necessary, and are executed by the CPU 20a.

Examples of the large-capacity storage 20d are a hard disk drive or a Solid State Drive (SSD). The same is similarly applied to the large-capacity storage 10d of the remote management device 1 described later.

The first print job execution software is software for the image forming apparatus 2 itself to execute a PC print job sent by the terminal 3. Hereinafter, such a PC print job is merely referred to as a "print job".

In the case where the image forming apparatus 2 itself is unable to execute the print job due to troubles or something, the first print job execution software enables the print job to be transferred to another image forming apparatus 2. The first print job execution software implements the functions of a job execution request receiving portion 201, a job execution control portion 202, a proxy device selecting portion 203, a job proxy command portion 204, and so on, all of which are shown in FIG. 4.

The troubles are, for example, a failure of the printing unit 20f, a paper jam, and a paper out.

On the other hand, the first print job proxy software is software for the image forming apparatus 2 to execute a print job in place of another image forming apparatus 2. The first print job proxy software implements the functions of a printing possibility informing portion 211, a job proxy command receiving portion 212, a speed reduction necessity determining portion 213, a job proxy control portion 214, and so on, all of which are shown in FIG. 5.

Hereinafter, the image forming apparatuses 2 may be described separately as an "image forming apparatus 2A", an "image forming apparatus 2B", . . . , and so on. It is supposed that all of the image forming apparatuses 2 correspond to a common page description language.

Referring back to FIG. 1, the terminal 3 is a client to obtain a PC printing service, for example, from the image forming apparatus 2. The terminal 3 has installed, therein, a driver for transmitting print data on an original (document) to the image forming apparatus 2. The terminal 3 may be a personal computer, a smartphone, a Personal Digital Assistant (PDA), or the like.

The following is a description of processing performed by the portions of the image forming apparatuses 2A and 2B shown in FIGS. 4 and 5 by taking an example in which the image forming apparatus 2A is unable to execute a print job sent by the terminal 3 due to a trouble, and therefore, the image forming apparatus 2B acts as a proxy to execute the print job for the image forming apparatus 2A. The description is given with reference to the sequence diagram of FIG. 6.

A user operates the terminal 3 to prepare document data. The user creates a document by using an application such as word processing software or rendering software. Alternatively, the user downloads such document data from a server on the Internet. The user enters a print job command into the terminal 3. At this time, the user designates an image forming apparatus 2 by means of which the print job is to be executed, and the set of prints. In this example, the image forming apparatus 2A is selected as the image forming apparatus 2 to execute the print job.

In response to the operation by the user, the terminal 3 starts the driver to perform the following processing. The terminal 3 converts the document data into print data 8A that is data on a common page description language. The terminal 3 then generates attribute data 8B indicating the number of pages of a print target document and the set of prints thereof. The terminal 3 then transmits the print data 8A and the attribute data 8B to the image forming apparatus 2 selected by the user, namely, the image forming apparatus 2A (Step #501 of FIG. 6).

In the image forming apparatus 2A, the job execution request receiving portion 201 shown in FIG. 4 accepts a request to execute the print job by receiving the print data 8A and the attribute data 8B from the terminal 3 (Step #502).

If the image forming apparatus 2A can execute the print job, then the job execution control portion 202 thereof controls the printing unit 20fa in such a manner that the print job is executed based on the print data 8A and the attribute data 8B transmitted by the terminal 3. Stated differently, the job execution control portion 202 controls the printing unit 20fa so that the document indicated in the print data 8A is printed out by the set of prints indicated in the attribute data 8B.

On the other hand, unless the image forming apparatus 2A can execute the print job, the proxy device selecting portion 203 and the job proxy command portion 204 thereof perform processing to cause another image forming apparatus 2 to execute the print job in place of the image forming apparatus 2A in the following manner.

The proxy device selecting portion 203 searches other image forming apparatuses 2 to determine which one of the image forming apparatuses 2 can execute the print job. The search and determination is performed, for example, in the following manner.

The proxy device selecting portion 203 instructs the other image forming apparatuses 2 to inform the proxy device selecting portion 203 of the individual current statuses for printing possibility (Step #503). At this time, the proxy device selecting portion 203 sends status reply request data 8C to each of the other image forming apparatuses 2.

In each of the other image forming apparatuses 2, when receiving the status reply request data 8C, the printing possibility informing portion 211 shown in FIG. 5 sends, to the origin of the status reply request data 8C, i.e., the image forming apparatus 2A, printing possibility reply data 8D indicating whether or not the printing unit 20f of the image forming apparatus 2 concerned can perform printing (Step #504). In this example, the processing is performed by, for example, the printing possibility informing portion 211 of the image forming apparatus 2B.

In the image forming apparatus 2A, upon the receipt of the printing possibility reply data 8D, the proxy device selecting portion 203 selects, from among the other image forming apparatuses 2, the origin of the printing possibility reply data 8D indicating that printing can be performed (Step #505). If there are image forming apparatuses 2 that can perform printing, then only one of the image forming apparatuses 2 is selected. For example, it is preferable to select, from among the image forming apparatuses 2 that can perform printing, an image forming apparatus 2 nearest to the image forming apparatus 2A compared to other image forming apparatuses 2. Alternatively, it is possible to select, from among the image forming apparatuses 2 that can perform printing, an image forming apparatus 2 having the same or closest specifications as/to those of the image forming apparatus 2A. In this example, the image forming apparatus 2B is selected from among the image forming apparatuses 2 that can perform printing.

The job proxy command portion 204 gives a command to the image forming apparatus 2 selected by the proxy device selecting portion 203, namely, the image forming apparatus 2B, to execute, by proxy, the print job sent by the terminal 3 (Step #506). At this time, the job proxy command portion 204 transfers the print data 8A and the attribute data 8B to the image forming apparatus 2B. Further, the job proxy command portion 204 sends, to the image forming apparatus 2B, print speed data 8E indicating the print speed currently set in the printing unit 20fa of the image forming apparatus 2A. Hereinafter, the print speed is referred to as a "faulty device print speed S1".

In the image forming apparatus 2B, the job proxy command receiving portion 212 shown in FIG. 5 accepts the command to execute, by proxy, the print job by receiving the print data 8A, the attribute data 8B, and the print speed data 8E from the image forming apparatus 2A (Step #507).

For execution of the print job in the image forming apparatus 2B, the speed reduction necessity determining portion 213 determines whether or not to reduce the print speed of the printing unit 20fb of the image forming apparatus 2B in the following way, for example (Step #508).

The speed reduction necessity determining portion 213 compares the print speed currently set in the printing unit 20fb of the image forming apparatus 2B with the faulty device print speed S1 indicated in the print speed data 8E. The former print speed is hereinafter referred to as a "proxy device print speed S2". If the proxy device print speed S2 is higher than the faulty device print speed S1, then the speed reduction necessity determining portion 213 determines that the print speed is to be reduced. Otherwise, the speed reduction necessity determining portion 213 determines that it is not necessary to reduce the print speed.

The job proxy control portion 214 controls the printing unit 20fb in such a manner that the print job is executed based on the print data 8A and the attribute data 8E transferred by the image forming apparatus 2A (Step #510). However, when the speed reduction necessity determining portion 213 determines that the print speed is to be reduced, the print speed is reduced to a print speed suitable for the low-speed printing mode (Step #509), and then, the print job is executed. In contrast, when the speed reduction necessity determining portion 213 determines that it is not necessary to reduce the print speed, it is preferable to execute the print job with the current print speed unchanged.

Figure 7:
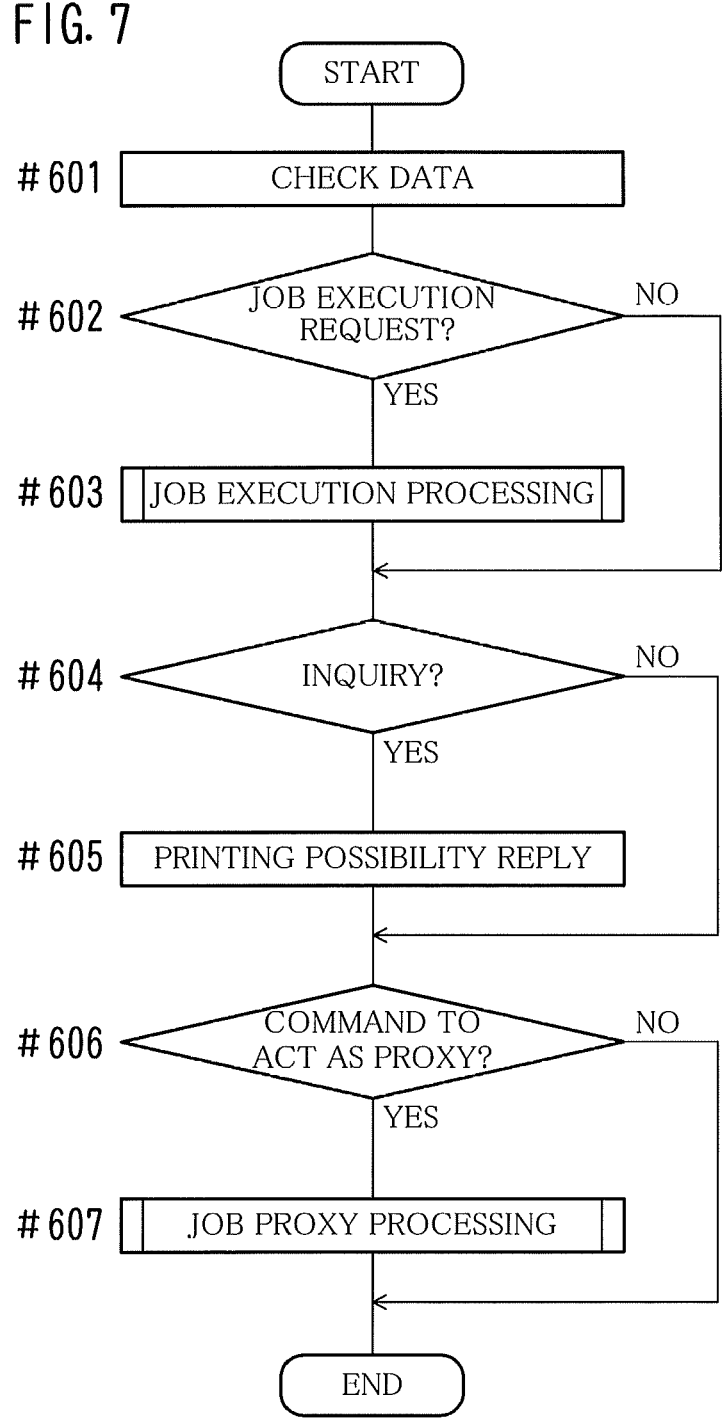
FIG. 7 is a flowchart depicting an example of the flow of the overall processing performed by an image forming apparatus in the first embodiment.
Figure 8:
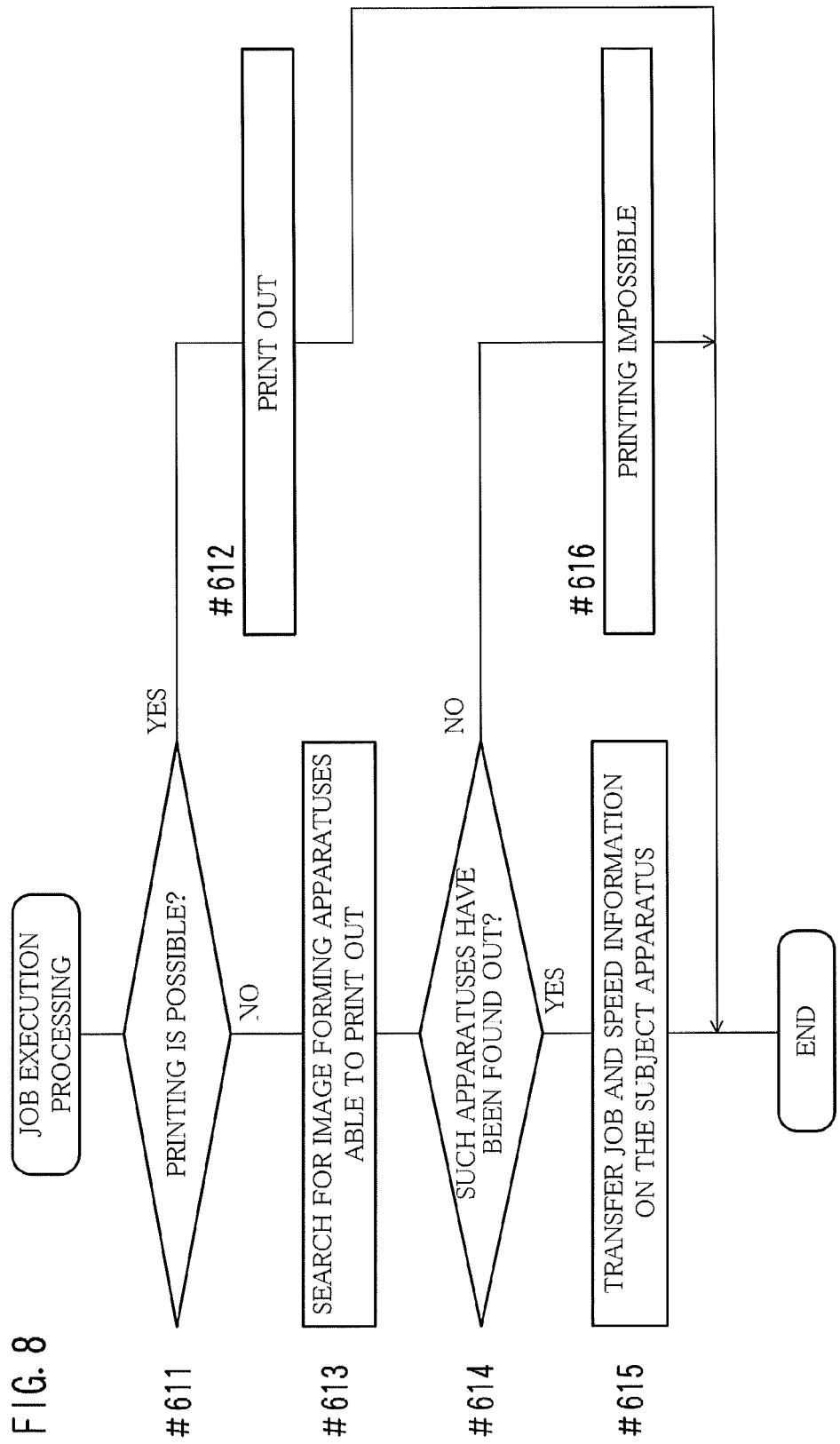
FIG. 8 is a flowchart depicting an example of the flow of job execution processing in the first embodiment.
Figure 9:
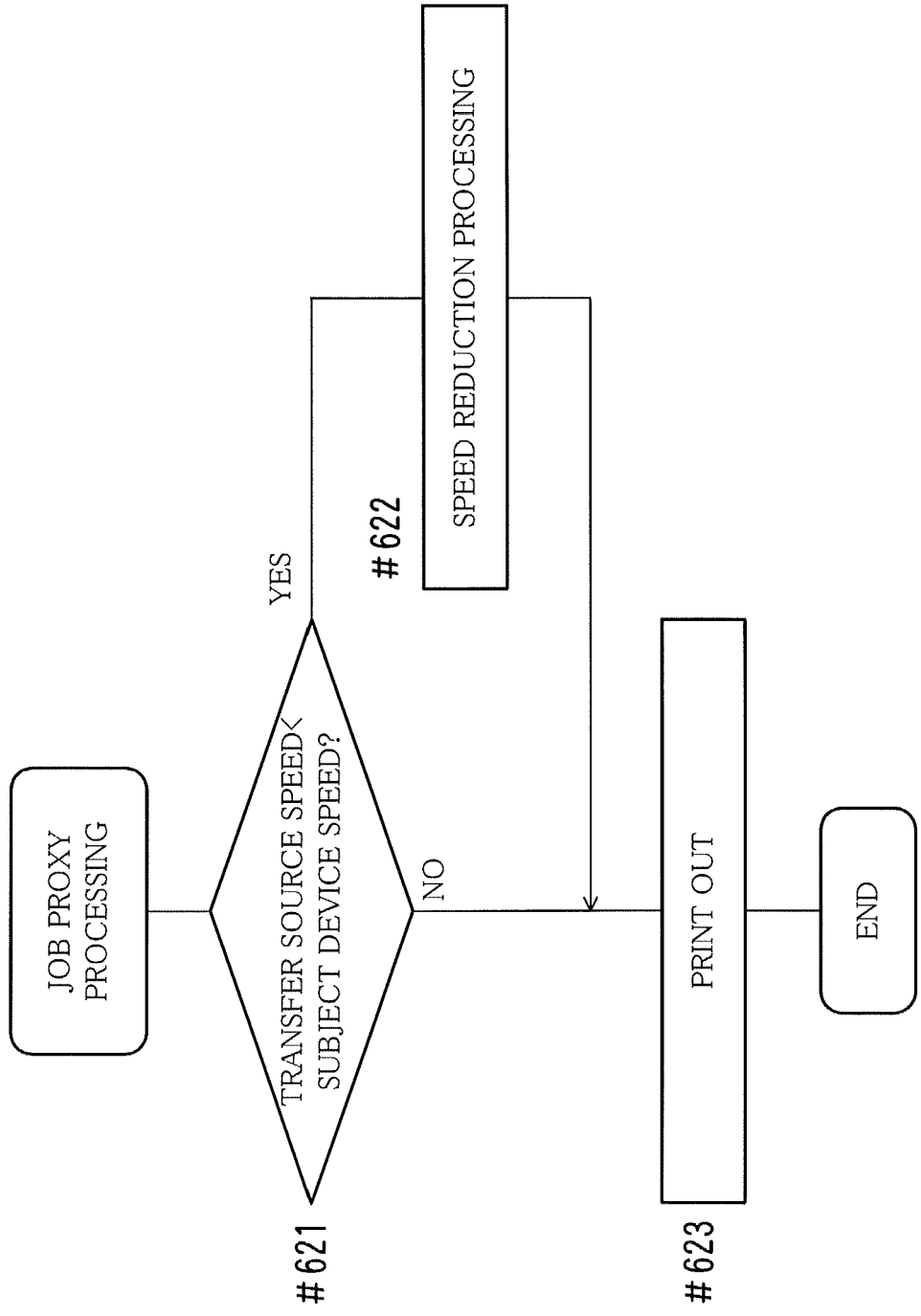
FIG. 9 is a flowchart depicting an example of the flow of job proxy processing in the first embodiment.

FIG. 7 is a flowchart depicting an example of the flow of the overall processing performed by the image forming apparatus 2 in the first embodiment; FIG. 8 is a flowchart depicting an example of the flow of job execution processing in the first embodiment; and FIG. 9 is a flowchart depicting an example of the flow of job proxy processing in the first embodiment.

Next, the flow of the overall processing performed by the image forming apparatus 2 is described with reference to the flowcharts of FIGS. 7-9.

Referring to FIG. 7, when receiving data from another device, the image forming apparatus 2 checks the data (Step #601), and executes the following processing in accordance with the details of the data.

If the image forming apparatus 2 receives the print data 8A and the attribute data 8B from the terminal 3, in other words, if the image forming apparatus 2 receives a request to execute a print job from the terminal 3 (Yes in Step #602), then the image forming apparatus 2 executes the print job as long as the image forming apparatus 2 itself is ready to execute the same (Step #603). Alternatively, the image forming apparatus 2 causes another image forming apparatus 2 to execute, by proxy, the print job as long as the image forming apparatus 2 that received the request is not ready to execute the same (Step #603). To be more specific, the image forming apparatus 2 that received the request performs the processing as shown in FIG. 8.

Referring to FIG. 8, if the image forming apparatus 2 can execute the print job (Yes in Step #611), then the image forming apparatus 2 executes the print job based on the print data 8A and the attribute data BE (Step #612).

On the other hand, if the image forming apparatus 2 is unable to execute the print job due to a trouble or something (No in Step #611), then the image forming apparatus 2 searches for other image forming apparatuses 2 that can perform printing (Step #613). At this time, the status reply request data 8C and the printing possibility reply data 8D are sent and received therebetween. When such image forming apparatuses 2 that can perform printing are found out by the search (Yes in Step #614), the subject image forming apparatus 2 transmits, to any one of the image forming apparatuses 2 thus found out, the print data 8A and the attribute data 8B received from the terminal 3 together with data indicating the print speed currently set in the subject image forming apparatus 2 (such data is referred to as "print speed data 8E") (Step #615). In this way, an instruction to execute the print job in place of the subject image forming apparatus 2 is given. When such image forming apparatuses 2 that can perform printing are not found out by the search (No in Step #614), the subject image forming apparatus 2 informs the terminal 3 that the print job cannot be executed and perform other operation. After that, the subject image forming apparatus 2 stops a series of processing for the print job (Step #616).

Referring back to FIG. 7, when receiving the status reply request data 8C from another image forming apparatus 2 (Yes in Step #604), the subject image forming apparatus 2 creates data indicating whether or not printing is currently possible therein, and sends the created data as the printing possibility reply data 8D to the other image forming apparatus 2 (Step #605).

When receiving the print data 8A, the attribute data 8B, and the print speed data 8E from another image forming apparatus 2 (Yes in Step #606), the subject image forming apparatus 2 executes the print job as a proxy for the other image forming apparatus 2, as depicted in the flowchart of FIG. 9 (Step #607). The print speed data 8E indicates the faulty device print speed S1.

If the proxy device print speed S2, i.e., the current print speed in the subject image forming apparatus 2, is higher than the faulty device print speed S1 (Yes in Step #621 of FIG. 9), then the subject image forming apparatus 2 determines that the current print speed is to be reduced, and executes the print job at a print speed suitable for the low-speed printing mode (Step #622 and Step #623). Otherwise (No in Step #621), the subject image forming apparatus 2 executes the print job with the current print speed retained (Step #623).

When a print speed suitable for the low-speed printing mode is already set in the image forming apparatus 2, the image forming apparatus 2 executes the print job with the current print speed unchanged. The same is similarly applied to the second through fourth embodiments.

[Second Embodiment]

Figure 10:
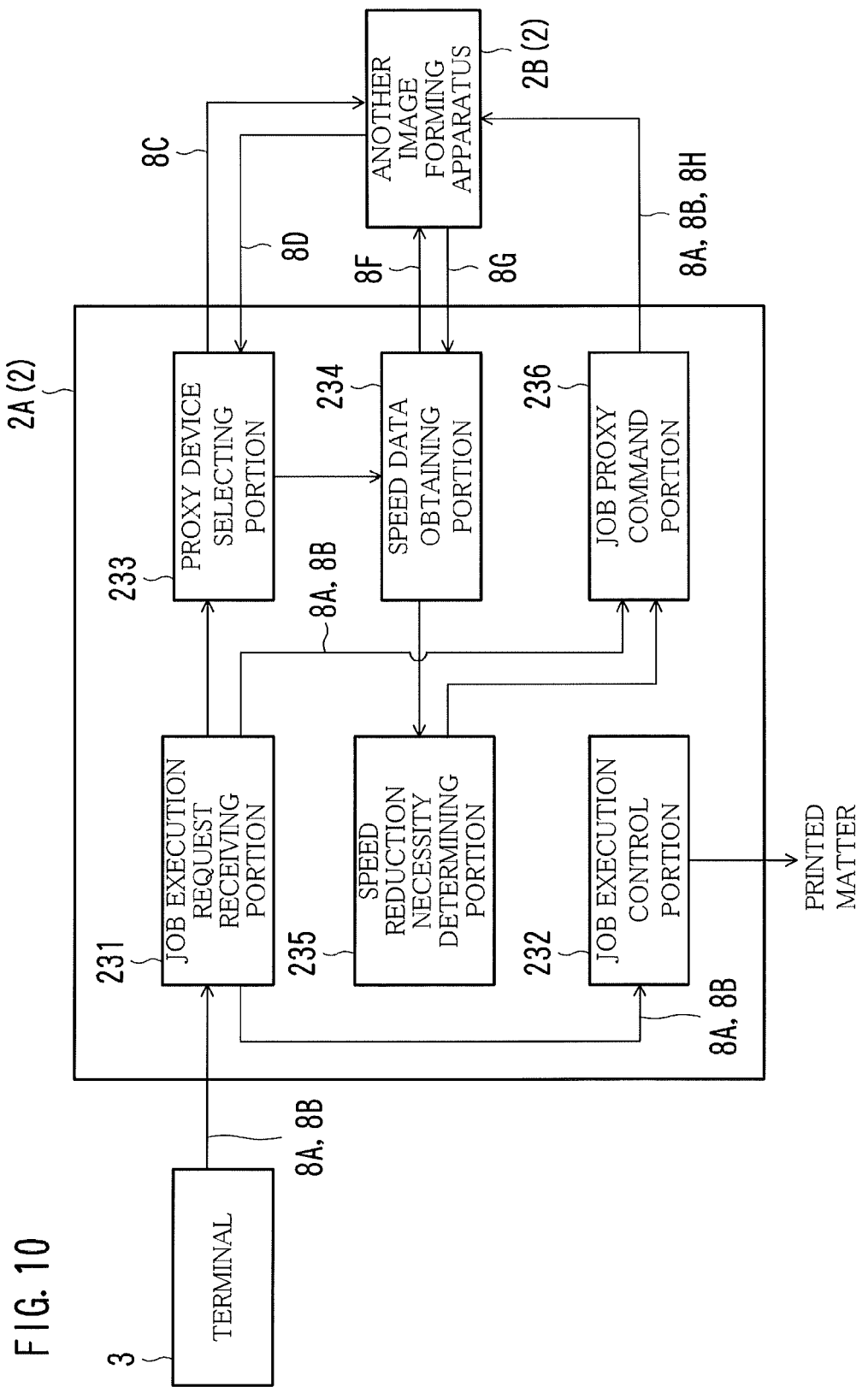
FIG. 10 is a diagram showing an example of the functional configuration implemented by second print job execution software in an image forming apparatus.
Figure 11:
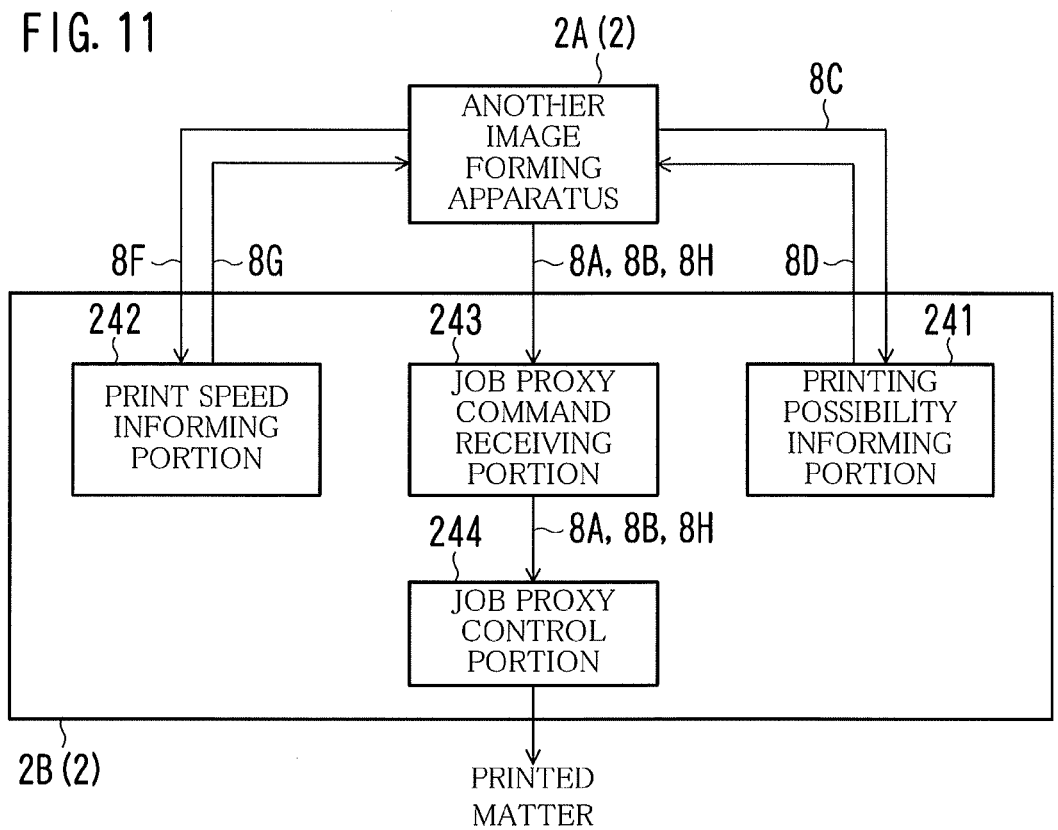
FIG. 11 is a diagram showing an example of the functional configuration implemented by second print job proxy software in an image forming apparatus.
Figure 12:
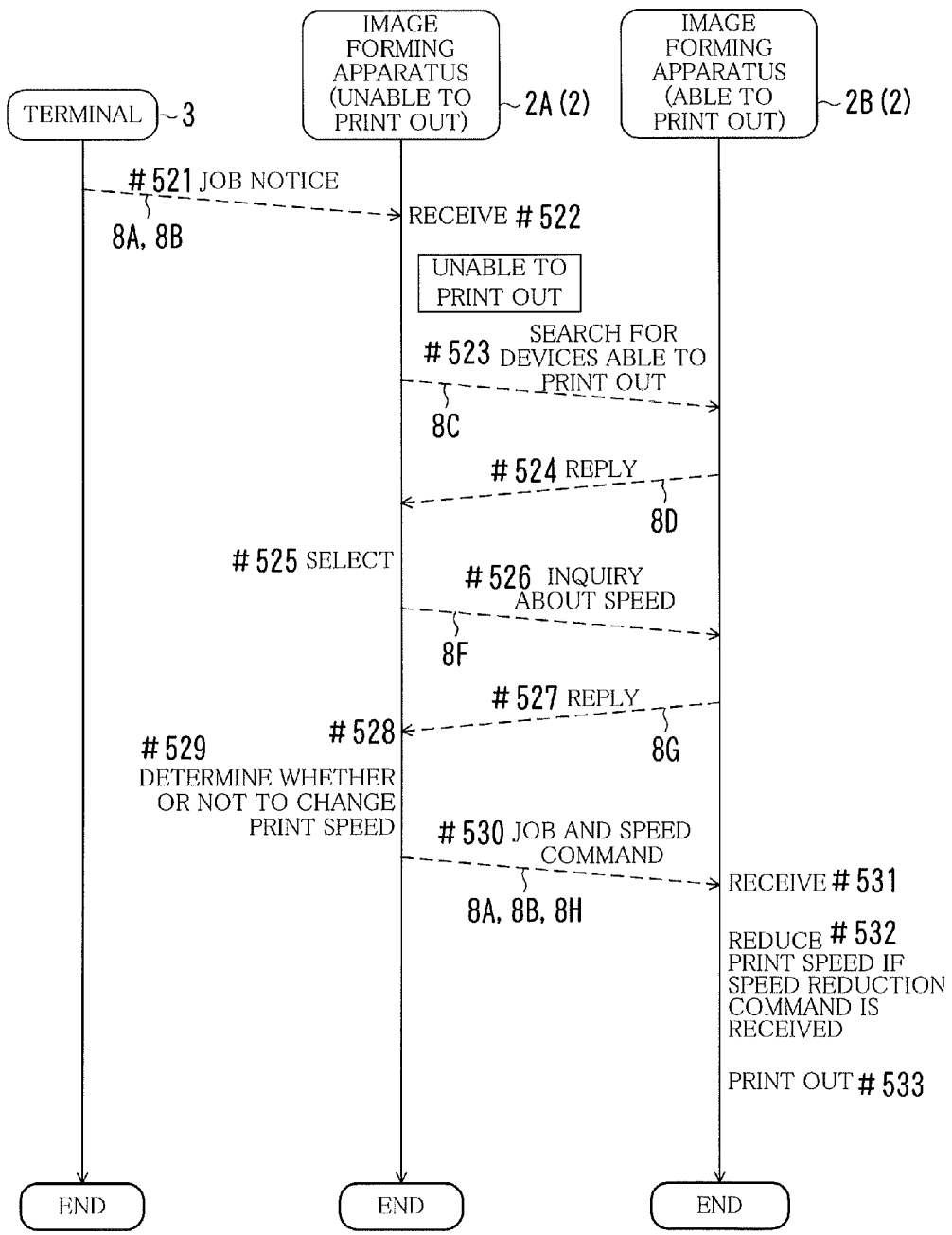
FIG. 12 is a sequence diagram showing an example of the flow of processing performed by devices in a second embodiment.

FIG. 10 is a diagram showing an example of the functional configuration implemented by second print job execution software in the image forming apparatus 2; FIG. 11 is a diagram showing an example of the functional configuration implemented by second print job proxy software in the image forming apparatus 2; and FIG. 12 is a sequence diagram showing an example of the flow of processing performed by the devices in the second embodiment.

According to the first embodiment, it is an image forming apparatus 2 acting as a proxy to execute a print job that determines whether or not to reduce a print speed. In contrast, in the second embodiment, an image forming apparatus 2 asking another image forming apparatus 2 to act as a proxy determines whether or not to reduce a print speed.

The overall configuration of the network printing system 100 in the second embodiment is the same as that in the first embodiment shown in FIG. 1. Likewise, the hardware configuration of the image forming apparatus 2 in the second embodiment is similar to that in the first embodiment shown in FIGS. 2 and 3. It is noted, however, that the ROM 20c or the large-capacity storage 20d in the second embodiment has installed, therein, the second print job execution software and the second print job proxy software instead of the first print job execution software and the first print job proxy software.

The second print job execution software is software for the subject image forming apparatus 2 to execute a print job sent by the terminal 3 as long as the subject image forming apparatus 2 can execute the print job, and, to transfer the print job to another image forming apparatus 2 as long as the subject image forming apparatus 2 is unable to execute the print job. The second print job execution software implements the functions of a job execution request receiving portion 231, a job execution control portion 232, a proxy device selecting portion 233, a speed data obtaining portion 234, a speed reduction necessity determining portion 235, a job proxy command portion 236, and so on, all of which are shown in FIG. 10.

On the other hand, the second print job proxy software is software for the subject image forming apparatus 2 to execute a print job in place of another image forming apparatus 2. The second print job proxy software implements the functions of a printing possibility informing portion 241, a print speed informing portion 242, a job proxy command receiving portion 243, a job proxy control portion 244, and so on, all of which are shown in FIG. 11.

The following is a description of processing performed by the portions of the image forming apparatuses 2A and 2B shown in FIGS. 10 and 11 by taking an example in which the image forming apparatus 2A is unable to execute a print job sent by the terminal 3 due to a trouble, and therefore, the image forming apparatus 2B acts as a proxy to execute the print job for the image forming apparatus 2A. The description is given with reference to the sequence diagram of FIG. 12. It is noted that description of parts that are identical with those in the first embodiment are omitted.

As with the first embodiment, the terminal 3 creates print data 8A and attribute data 8B, and sends the created data to the image forming apparatus 2 selected by a user (image forming apparatus 2A in this example) (Step #521 of FIG. 12).

In the image forming apparatus 2A, the job execution request receiving portion 231 shown in FIG. 10 accepts a request to execute a print job by receiving the print data 8A and the attribute data 8B from the terminal (Step #522), as with the case of the job execution request receiving portion 201 in the first embodiment.

As with the case of the job execution control portion 202 in the first embodiment, if the image forming apparatus 2A can execute the print job, then the job execution control portion 232 thereof controls the printing unit 20fa in such a manner that the print job is executed based on the print data 8A and the attribute data 8B.

On the other hand, unless the image forming apparatus 2A itself can execute the print job, the proxy device selecting portion 233 through the job proxy command portion 236 thereof discussed above perform processing to cause another image forming apparatus 2 to execute the print job in place of the image forming apparatus 2A in the following manner.

As with the proxy device selecting portion 203 in the first embodiment, the proxy device selecting portion 233 selects a device to which a request to act as a proxy to execute the print job is to be made (Step #523 and Step #525). At this time, the printing possibility informing portions 241 of other image forming apparatuses 2 receive the printing possibility reply data 8D and send the status reply request data 8C to the image forming apparatus 2A (Step #524), as with the printing possibility informing portion 211 (see FIG. 5) in the first embodiment.

The speed data obtaining portion 234 obtains data indicating the print speed currently set in the image forming apparatus 2 selected by the proxy device selecting portion 233 (image forming apparatus 2B in this example) in the following manner.

The speed data obtaining portion 234 inquires of the image forming apparatus 2B as to the print speed currently set therein by sending speed reply request data 8F to the image forming apparatus 2B (Step #526).

In the image forming apparatus 2B, when receiving the speed reply request data 8F, the print speed informing portion 242 creates print speed data 8G indicating the print speed currently set in the printing unit 20fb of the image forming apparatus 2B (such speed is hereinafter referred to as "proxy device print speed S4"), and sends the created print speed data 8G to the image forming apparatus 2A (Step #527).

In the image forming apparatus 2A, the speed data obtaining portion 234 receives the print speed data 8G (Step #528).

The speed reduction necessity determining portion 235 determines, in the following way, whether or not to reduce the print speed of the image forming apparatus 2B acting as a proxy to execute the print job (Step #529).

The speed reduction necessity determining portion 235 compares the proxy device print speed S4 indicated in the print speed data 8G with the print speed currently set in the printing unit 20fa of the image forming apparatus 2A. The latter print speed is hereinafter referred to as a "faulty device print speed S3". If the proxy device print speed S4 is higher than the faulty device print speed S3, then the speed reduction necessity determining portion 235 determines that the print speed is to be reduced. Otherwise, the speed reduction necessity determining portion 213 determines that it is not necessary to reduce the print speed.

The job proxy command portion 236 gives a command to the image forming apparatus 2 selected by the proxy device selecting portion 233, namely, the image forming apparatus 2B, to execute the print job sent by the terminal 3 in place of the image forming apparatus 2A (Step #530). At this time, the job proxy command portion 236 transfers the print data 8A and the attribute data 8B to the image forming apparatus 2B, as with the job proxy command portion 204 in the first embodiment. Further, if the speed reduction necessity determining portion 235 determines that the print speed should be reduced, then the job proxy command portion 236 creates speed reduction command data 8H indicating a command to reduce the print speed, and sends the same together with the print data 8A and so on to the image forming apparatus 2B.

In the image forming apparatus 2B, the job proxy command receiving portion 243 shown in FIG. 11 accepts a command to act as a proxy to execute the print job by receiving the print data 8A and the attribute data 8B from the image forming apparatus 2A (Step #531). If the speed reduction command data 8H is sent together with the print data 8A, then the job proxy command receiving portion 243 receives a command to reduce the print speed by receiving the speed reduction command data 8H.

The job proxy control portion 244 controls the printing unit 20fb in such a manner that the print job is executed based on the print data 8A and the attribute data 8B transferred by the image forming apparatus 2A (Step #533). However, when the command to reduce the print speed is received, the print speed is reduced to a print speed suitable for the low-speed printing mode (Step #532), and then, the print job is executed. In contrast, when no command to reduce the print speed is received, it is preferable to execute the print job with the current print speed unchanged.

Figure 13:
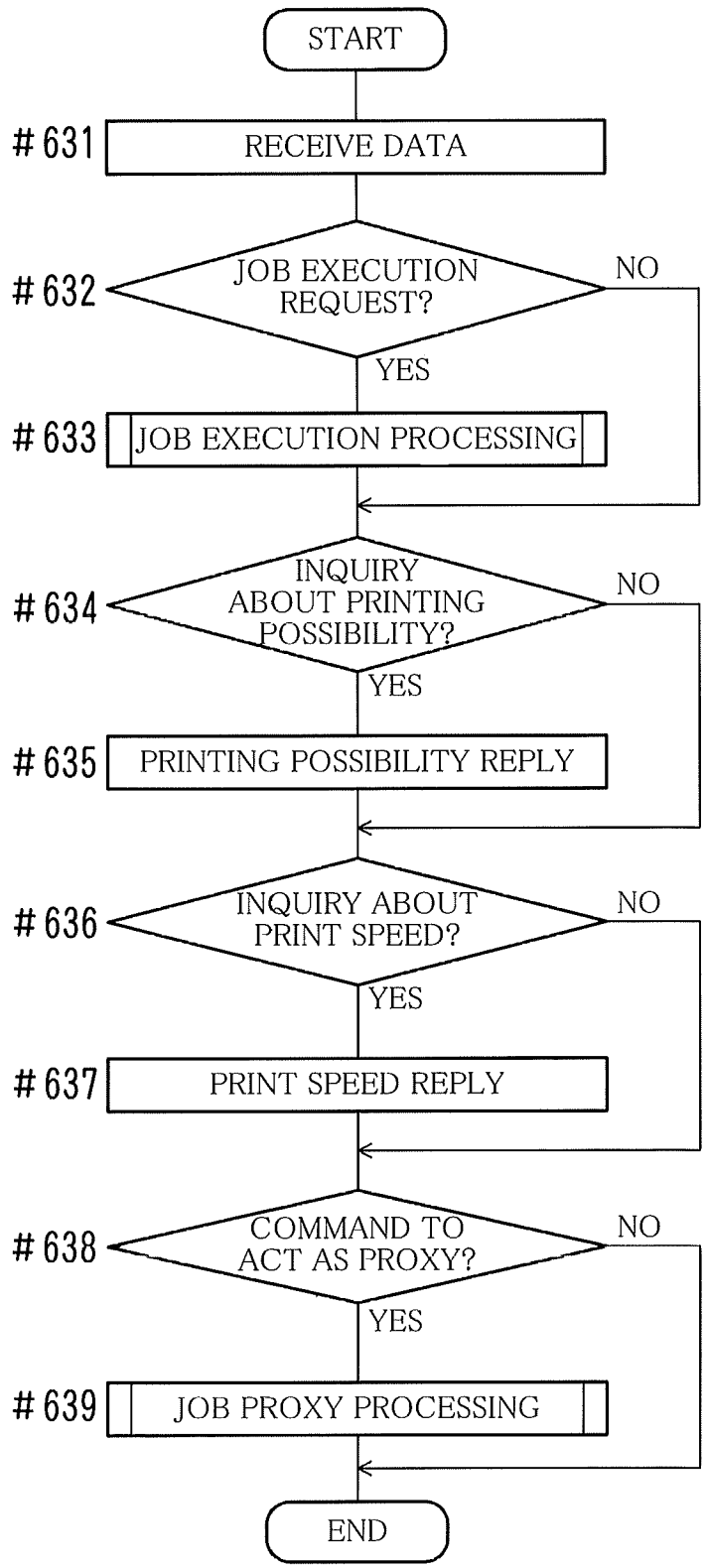
FIG. 13 is a flowchart depicting an example of the flow of the overall processing performed by an image forming apparatus in the second embodiment.
Figure 14:
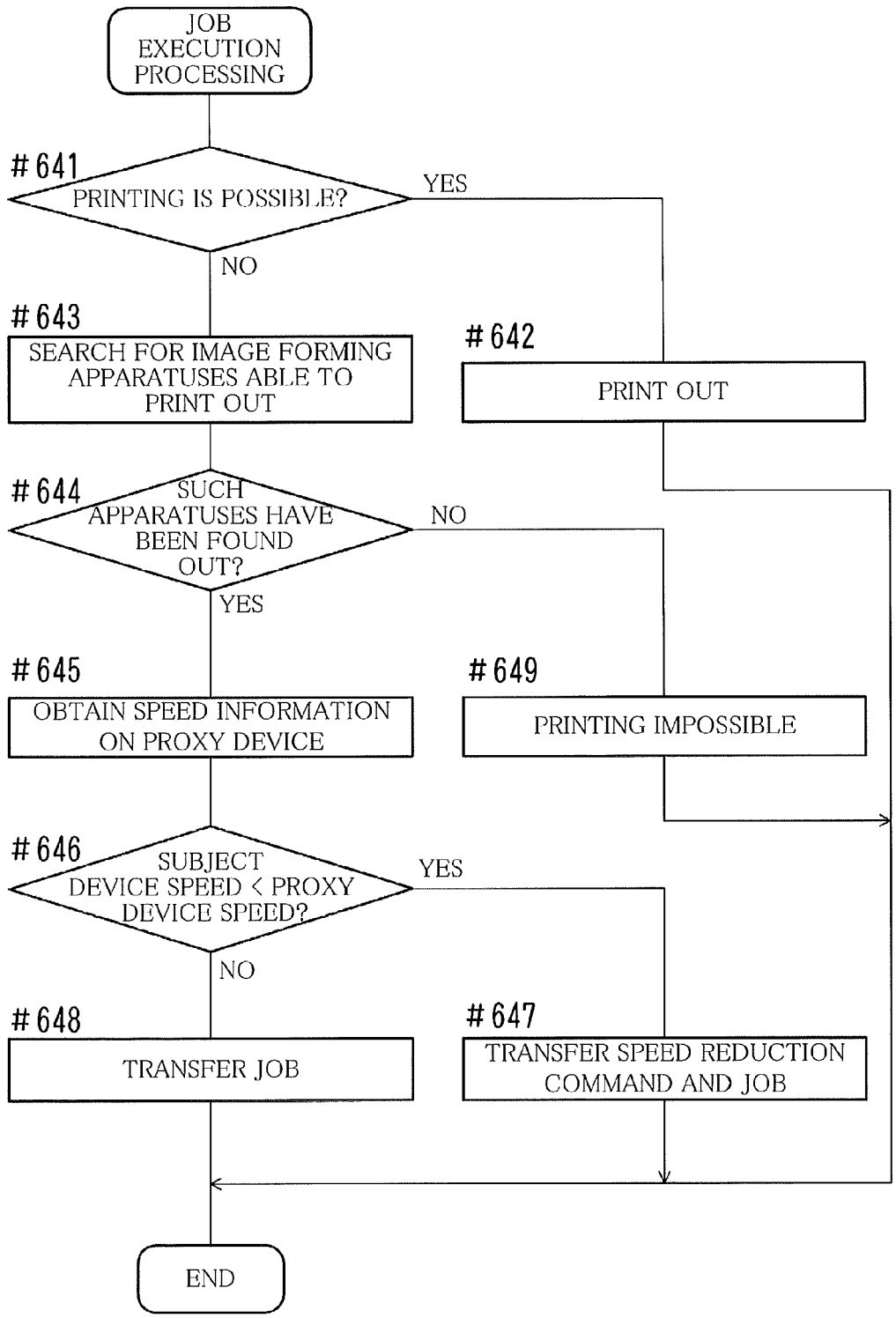
FIG. 14 is a flowchart depicting an example of the flow of job execution processing in the second embodiment.
Figure 15:
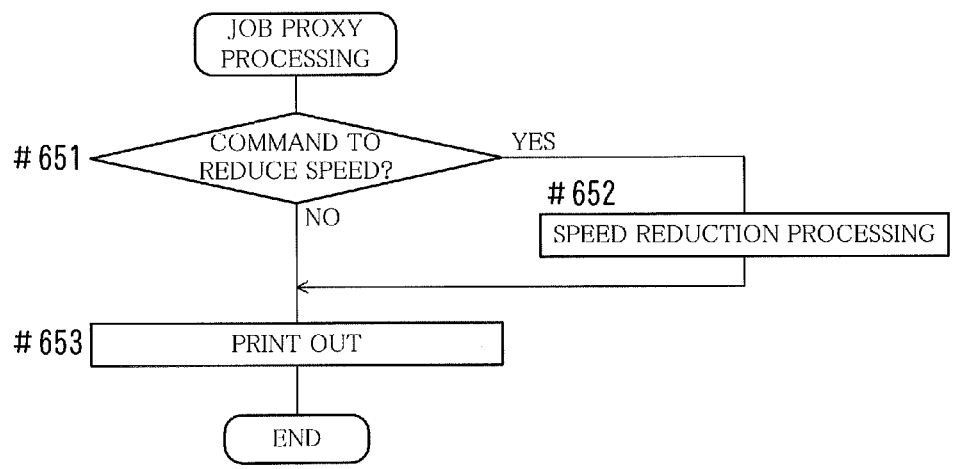
FIG. 15 is a flowchart depicting an example of the flow of job proxy processing in the second embodiment.

FIG. 13 is a flowchart depicting an example of the flow of the overall processing performed by the image forming apparatus 2 in the second embodiment; FIG. 14 is a flowchart depicting an example of the flow of job execution processing in the second embodiment; and FIG. 15 is a flowchart depicting an example of the flow of job proxy processing in the second embodiment.

Next, the flow of the overall processing performed by the image forming apparatus 2 according to the second embodiment is described with reference to the flowcharts of FIGS. 13-15.

Referring to FIG. 13, when receiving data from another device, the image forming apparatus 2 checks the data (Step #631), and executes the following processing in accordance with the details of the data.

If the image forming apparatus 2 receives the print data 8A and the attribute data 8B from the terminal 3, in other words, if the image forming apparatus 2 receives a request to execute a print job from the terminal 3 (Yes in Step #632), then the image forming apparatus 2 executes the print job as long as the image forming apparatus 2 that received the request is ready to execute the same (Step #633). Alternatively, the image forming apparatus 2 causes another image forming apparatus 2 to execute, by proxy, the print job as long as the image forming apparatus 2 that received the request is not ready to execute the same (Step #633). To be more specific, the image forming apparatus 2 that received the request performs the processing as shown in FIG. 14.

If the image forming apparatus 2 can execute the print job (Yes in Step #641), then the image forming apparatus 2 executes the print job based on the print data 8A and the attribute data 8B (Step #642) in a manner similar to that of the first embodiment.

On the other hand, if the image forming apparatus 2 is unable to execute the print job (No in Step #641), then the image forming apparatus 2 selects another image forming apparatus 2 that can perform printing (Step #643) in a manner similar to that of the first embodiment. In contrast, when such another image forming apparatus 2 that can perform printing is not found out (No in Step #644), the subject image forming apparatus 2 stops a series of processing for the print job (Step #649).

The image forming apparatus 2 inquires of the selected image forming apparatus 2 as to the print speed currently set therein (Yes in Step #644, and Step #645). At this time, the speed reply request data 8F and the print speed data 8G are sent and received therebetween. The print speed data 8G indicates the proxy device print speed S4.

If the proxy device print speed S4 is higher than the faulty device print speed S3, i.e., the current print speed in the subject image forming apparatus 2 (Yes in Step #646), then the subject image forming apparatus 2 determines that the current print speed is to be reduced, and sends the print data 8A and the attribute data 8B together with the speed reduction command data 8H to the image forming apparatus 2 selected in Step #643 (Step #647). In this way, a command to execute the print job in place of the subject image forming apparatus 2 and a command to reduce the print speed are given to the selected image forming apparatus 2. If the proxy device print speed S4 is not higher than the faulty device print speed S3 (No in Step #646), then the subject image forming apparatus 2 sends the print data 8A and the attribute data 8B without the speed reduction command data 8H (Step #648). In this way, only a command to execute, by proxy, the print job is given to the selected image forming apparatus 2.

Referring back to FIG. 13, when receiving the status reply request data 8C from the other image forming apparatus 2 (Yes in Step #634), the subject image forming apparatus 2 creates printing possibility reply data 8D, and sends the same to the other image forming apparatus 2 (Step #635) as with the first embodiment.

When receiving the speed reply request data 8F from the other image forming apparatus 2 (Yes in Step #636), the subject image forming apparatus 2 creates data indicating the print speed currently set in the printing unit 20*fb* of the subject image forming apparatus 2, and sends the created data to the other image forming apparatus 2 as the print speed data 8G (Step #637).

When receiving the print data 8A and the attribute data 8B from the other image forming apparatus 2 (Yes in Step #638), the subject image forming apparatus 2 executes the print job as depicted in the flowchart of FIG. 15 in place of the other image forming apparatus 2 (Step #639).

To be specific, when receiving the speed reduction command data 8H along with the print data 8A and the attribute data 8B (Yes in Step #651 of FIG. 15), the image forming apparatus 2 executes the print job at a print speed suitable for the low-speed printing mode (Step #652 and Step #653). When receiving only the print data 8A and the attribute data 8B (No in Step #651), the image forming apparatus 2 executes the print job with the current print speed unchanged (Step #653).

[Third Embodiment]

Figure 16:
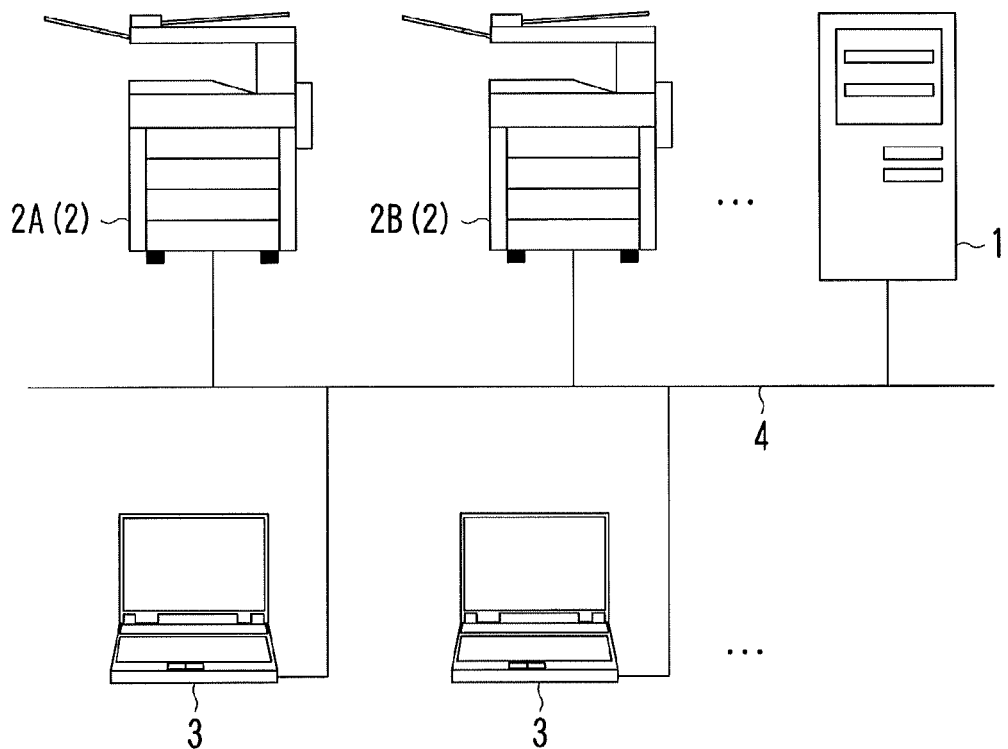
FIG. 16 is a diagram showing an example of the overall configuration of a network printing system.
Figure 17:
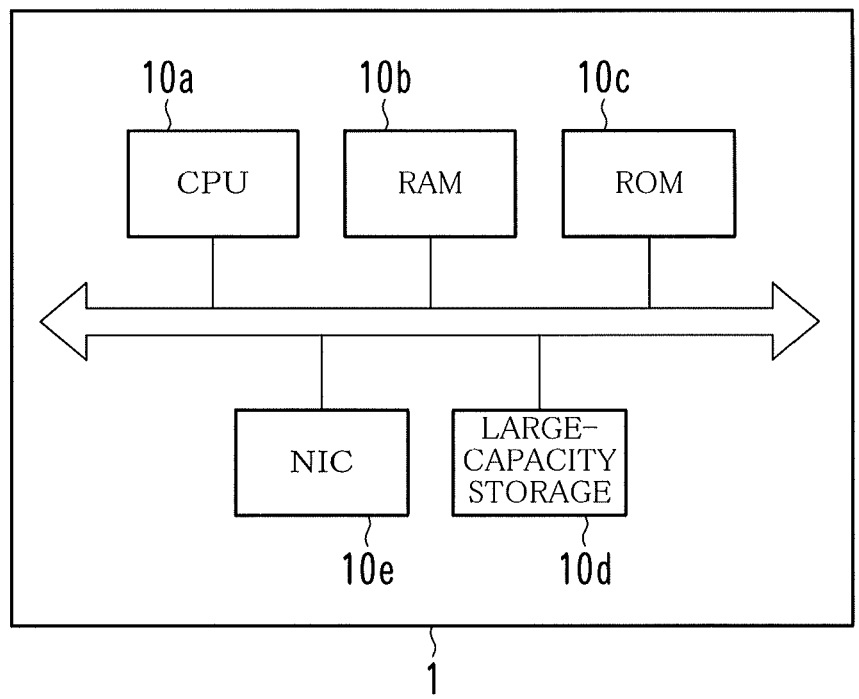
FIG. 17 is a diagram showing an example of the hardware configuration of a remote management device.
Figure 18:
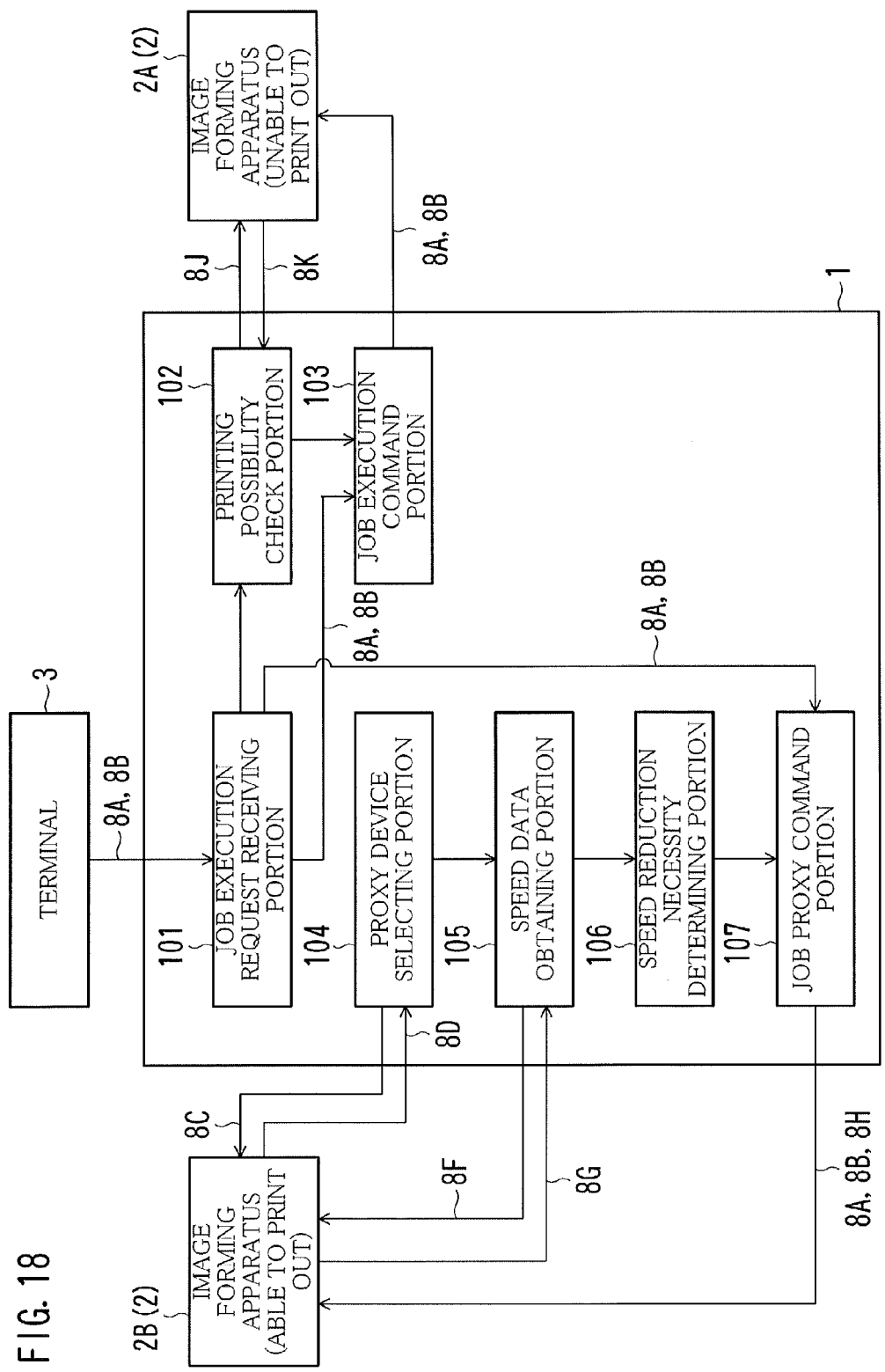
FIG. 18 is a diagram showing an example of the functional configuration of a remote management device.
Figure 19:
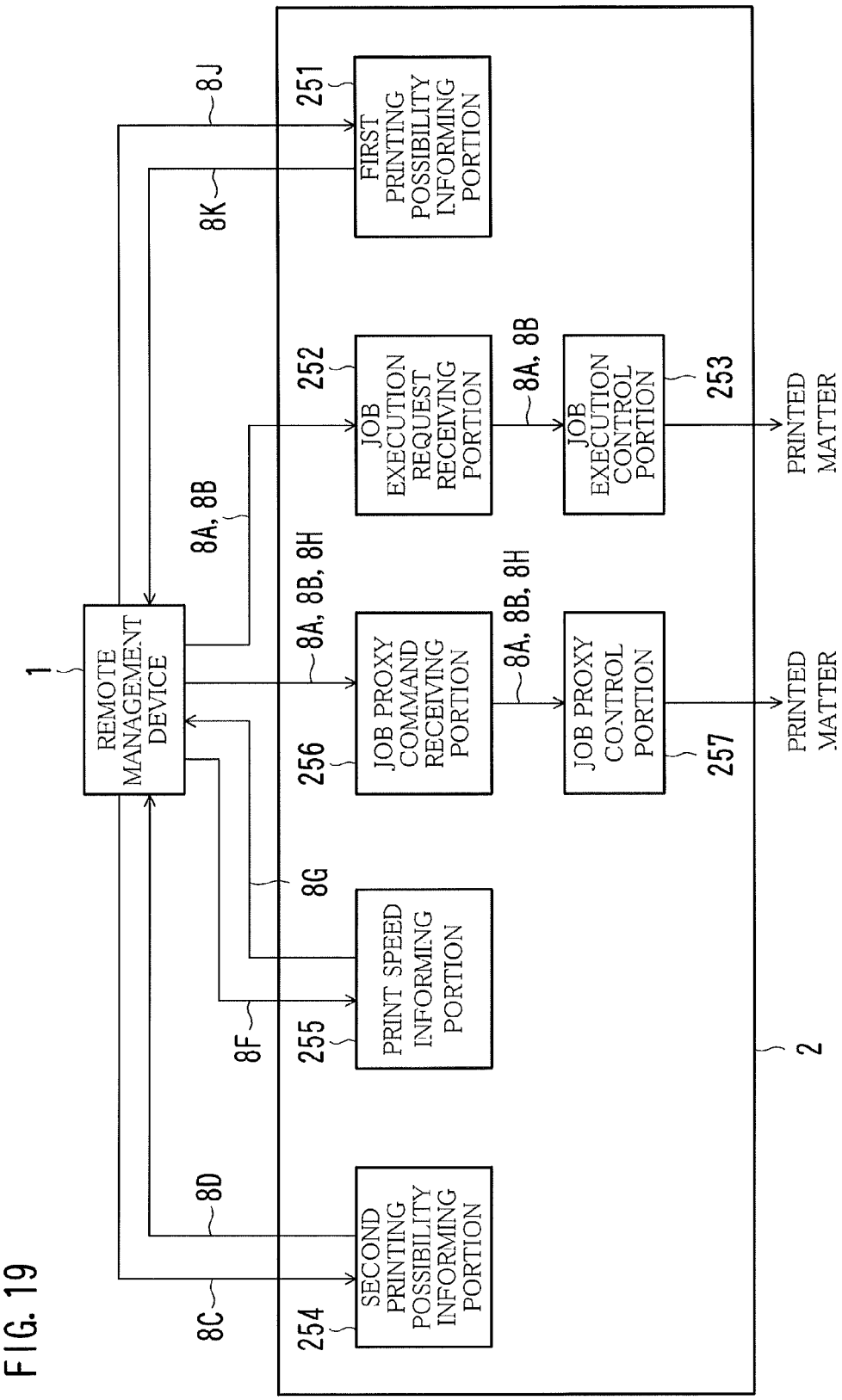
FIG. 19 is a diagram showing an example of the functional configuration implemented by third print job execution software in an image forming apparatus.
Figure 20:
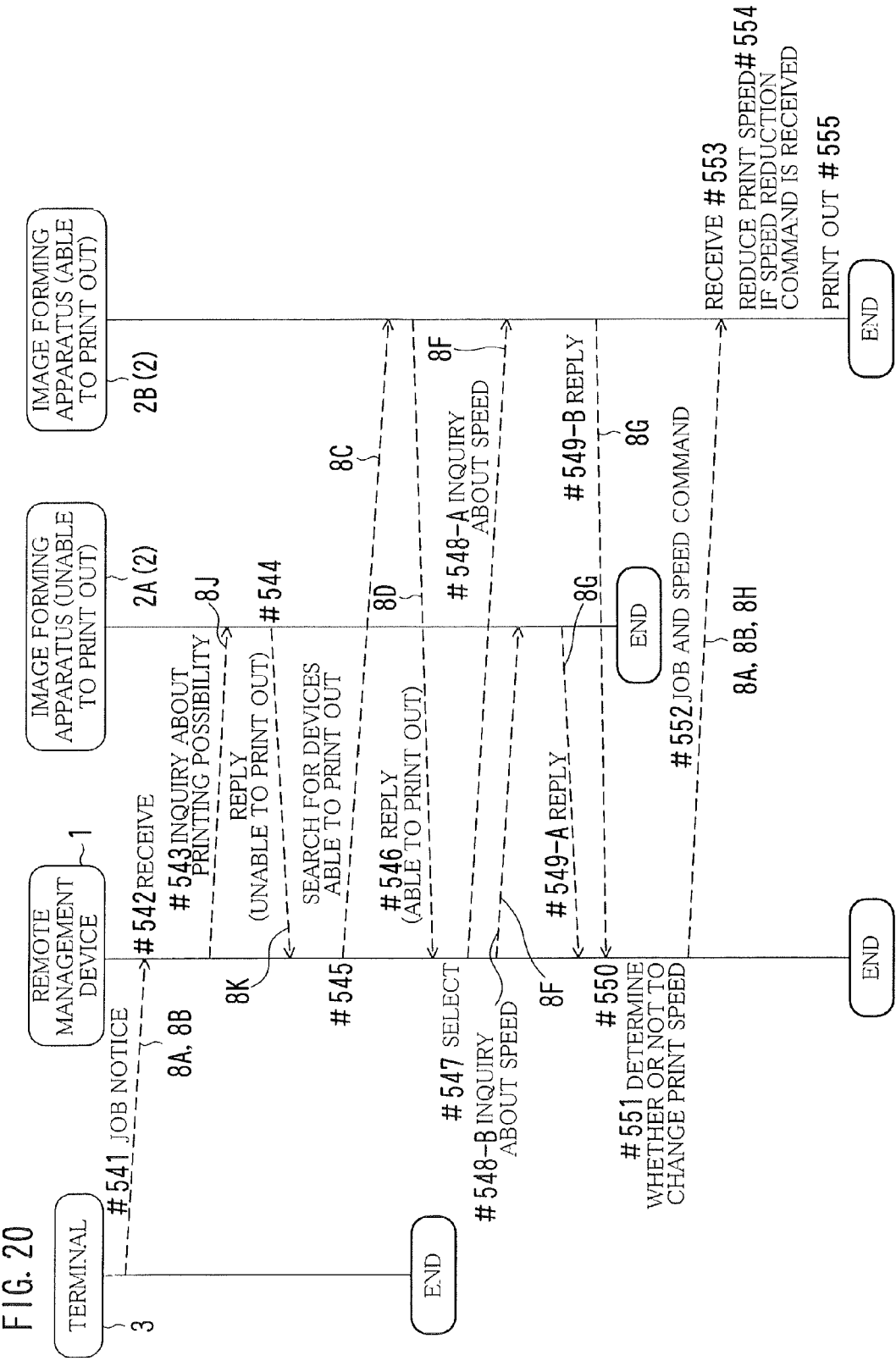
FIG. 20 is a sequence diagram showing an example of the flow of processing performed by devices in a third embodiment.

FIG. 16 is a diagram showing an example of the overall configuration of a network printing system 100'; FIG. 17 is a diagram showing an example of the hardware configuration of a remote management device 1; FIG. 18 is a diagram showing an example of the functional configuration of the remote management device 1; FIG. 19 is a diagram showing an example of the functional configuration implemented by third print job execution software in the image forming apparatus 2; and FIG. 20 is a sequence diagram showing an example of the flow of processing performed by devices according to the third embodiment.

As shown in FIG. 16, the network printing system 100' according to the third embodiment is configured of the remote management device 1, a plurality of the image forming apparatuses 2, at least one terminal 3, the communication line 4, and so on. The comparison from the network printing system 100 of FIG. 1 shows that, in addition to the devices thereof, the network printing system 100' in the third embodiment is further provided with the remote management device 1. The remote management device 1 can perform communication with the individual image forming apparatuses 2 and the terminal 3 via the communication line 4.

In the foregoing first and second embodiments, the image forming apparatus 2 receives a request to execute a print job from the terminal 3 without, the remote management device 1. In the third embodiment, however, such a request is received through the remote management device 1.

Further, in the third embodiment, it is the remote management device 1 that determines whether or not to reduce the print speed for a case where a proxy device executes a print job.

Referring to FIG. 17, the remote management device 1 is configured of a CPU 10*a*, a RAM 10*b*, a ROM 10*c*, a large-capacity storage 10*d*, an NIC 10*e*, and so on. The remote management device 1 may be a so-called server machine.

The NIC 10e performs communication with the image forming apparatus 2 and the terminal 3 in accordance with a protocol such as TCP/IP.

Referring to FIG. 18, the large-capacity storage 10d stores, therein, software for implementing the functions of a job execution request receiving portion 101, a printing possibility check portion 102, a job execution command portion 103, a proxy device selecting portion 104, a speed data obtaining portion 105, a speed reduction necessity determining portion 106, a job proxy command portion 107, and so on. Modules of the software are loaded into the RAM 10b as necessary, and are executed by the CPU 10a.

The hardware configuration of the image forming apparatus 2 is similar to those in the first and second embodiments (see FIGS. 2 and 3). It is noted, however, that the ROM 20c or the large-capacity storage 20d in the third embodiment has installed, therein, third print job execution software instead of the first print job execution software and the first print job proxy software.

The third print job execution software implements the functions of a first printing possibility informing portion 251, a job execution request receiving portion 252, a job execution control portion 253, a second printing possibility informing portion 254, a print speed informing portion 255, a job proxy command receiving portion 256, a job proxy control portion 257, and so on, all of which are shown in FIG. 19.

The following is a description of processing performed by the portions of the remote management device 1 and the image forming apparatus 2 shown in FIGS. 18 and 19 by taking an example in which the image forming apparatus 2A is unable to execute a print job sent by the terminal 3 due to a trouble, and therefore, the image forming apparatus 2B acts as a proxy to execute the print job for the image forming apparatus 2A. The description is given with reference to the sequence diagram of FIG. 20. It is noted that description of parts that are identical with those in the first or second embodiment are omitted.

As with the first and second embodiments, the terminal 3 creates print data 8A and attribute data 8B. It is noted, however, that, in the third embodiment, the created print data 8A and attribute data 8B are sent to the remote management device 1 instead of being sent to the image forming apparatus 2 selected by a user (image forming apparatus 2A in this example) (Step #541 of FIG. 20).

In the remote management device 1, the job execution request receiving portion 101 shown in FIG. 18 accepts a request to execute a print job by receiving the print data 8A and the attribute data 8B from the terminal 3 (Step #542).

The printing possibility check portion 102 checks whether or not the image forming apparatus 2 indicated in the attribute data 8B, i.e., the image forming apparatus 2 selected by the user (image forming apparatus 2A in this example), can perform printing, for example, by the following method.

The printing possibility check portion 102 sends the printing possibility reply request data 8J to the image forming apparatus 2A (Step #543).

In the image forming apparatus 2 (image forming apparatus 2A in this example), when receiving the printing possibility reply request data 8J, the first printing possibility informing portion 251 generates printing possibility reply data 8K indicating whether or not the printing unit 20fa of the subject image forming apparatus 2 can perform printing, and sends the generated printing possibility reply data 8K to the remote management device 1 (Step #544).

The printing possibility check portion 102 of the remote management device 1 determines, based on the printing possibility reply data 8K received from the image forming apparatus 2A, whether or not the image forming apparatus 2A can perform printing.

When it is confirmed that the image forming apparatus 2 indicated in the attribute data 8B, i.e., the image forming apparatus 2A, can perform printing, the job execution command portion 103 transfers the print data 8A and the attribute data 8B to the image forming apparatus 2A. Thereby, a request to execute the print job is transferred to the image forming apparatus 2A.

As with the job execution request receiving portion 201 (see FIG. 4) of the first embodiment, in the image forming apparatus 2 (image forming apparatus 2A in this example), the job execution request receiving portion 252 accepts a command to execute the print job by receiving the print data 8A and the attribute data 8B. As with the job execution control portion 202 of the first embodiment, the job execution control portion 253 controls the printing unit 20fa in such a manner that the print job is executed based on the print data 8A and the attribute data 8B.

On the other hand, when it is confirmed that the image forming apparatus 2A is unable to perform printing, the proxy device selecting portion 104 sends the status reply request data 8C to other image forming apparatuses 2 and receives the printing possibility reply data 8D therefrom, as with the proxy device selecting portion 203 of the first embodiment. Thereby, the proxy device selecting portion 104 selects, from among the other image forming apparatuses 2, an image forming apparatus 2 to which a request to act as a proxy to execute the print job is to be made, as with the proxy device selecting portion 203 of the first embodiment (Step #545-Step #547). In this example, the image forming apparatus 2B is selected.

At this time, the second printing possibility informing portions 254 of the other image forming apparatuses 2 generate status reply request data 8C and send the same, as with the printing possibility informing portion 211 of the first embodiment (Step #546). It is noted that the destination to which the status reply request data 8C is sent is the remote management device 1.

The speed data obtaining portion 105 obtains data indicating the print speed currently set in the image forming apparatus 2 indicated in the attribute data 8B (image forming apparatus 2A in this example) and data indicating the print speed currently set in the image forming apparatus 2 selected by the proxy device selecting portion 104 (image forming apparatus 2B in this example) in the following manner.

The speed data obtaining portion 105 inquires of the image forming apparatus 2A and the image forming apparatus 2B as to the print speed currently set therein by sending speed reply request data 8F thereto (Step #548-A, and #548-B).

In response to the inquiry, the print speed informing portion 255 of each of the image forming apparatuses 2A and 2B creates print speed data 8G indicating the print speed currently set in the printing unit 20f of each of the image forming apparatuses 2A and 2B (Step #549-A, and Step #549-B).

In the remote management device 1, the speed data obtaining portion 105 receives the print speed data 8G from the image forming apparatuses 2A and 2B (Step #550).

The speed reduction necessity determining portion 106 determines, based on the print speed data 8G from each of the image forming apparatuses 2A and 2B, whether or not to reduce the print speed in the image forming apparatus 2B for a case where the print job is executed by proxy in the following way (Step #551).

The speed reduction necessity determining portion 106 compares the print speed indicated in the print speed data 8G for the image forming apparatus 2B (hereinafter, refereed to as "proxy device print speed S6") with the print speed indicated in the print speed data 8G for the image forming apparatus 2A (hereinafter, refereed to as "faulty device print speed S5"). If the proxy device print speed S6 is higher than the faulty device print speed S5, then the speed reduction necessity determining portion 106 determines that the print speed is to be reduced. Otherwise, the speed reduction necessity determining portion 106 determines that it is not necessary to reduce the print speed.

The job proxy command portion 107 gives a command to the image forming apparatus 2 selected by the proxy device selecting portion 104, namely, the image forming apparatus 2B, to execute the print job sent by the terminal 3 in place of the image forming apparatus 2A (Step #552). At this time, the job proxy command portion 107 transfers the print data 8A and the attribute data 8B to the image forming apparatus 2B. Further, as with the second embodiment, if the speed reduction necessity determining portion 106 determines that the print speed should be reduced, then the job proxy command portion 107 creates speed reduction command data 8H indicating a command to reduce the print speed, and sends the created speed reduction command data 8H together with the print data 8A and so on.

In the image forming apparatus 2 to act as a proxy to execute the print job (image forming apparatus 2B in this example), the job proxy command receiving portion 256 and the job proxy control portion 257 receive the print data 8A and the attribute data 8B (Step #553), and controls the printing unit 20fb in such a manner that the print job is executed based on the print data 8A and the attribute data 8B (Step #555), similarly to the case of the job proxy command receiving portion 243 and the job proxy control portion 244 (see FIG. 11) of the second embodiment. If the image forming apparatus 2B also receives the speed reduction command data 8H, then the print speed is reduced to the print speed suitable for the low-speed printing mode (Step #554) and the print job is executed.

Figure 21:
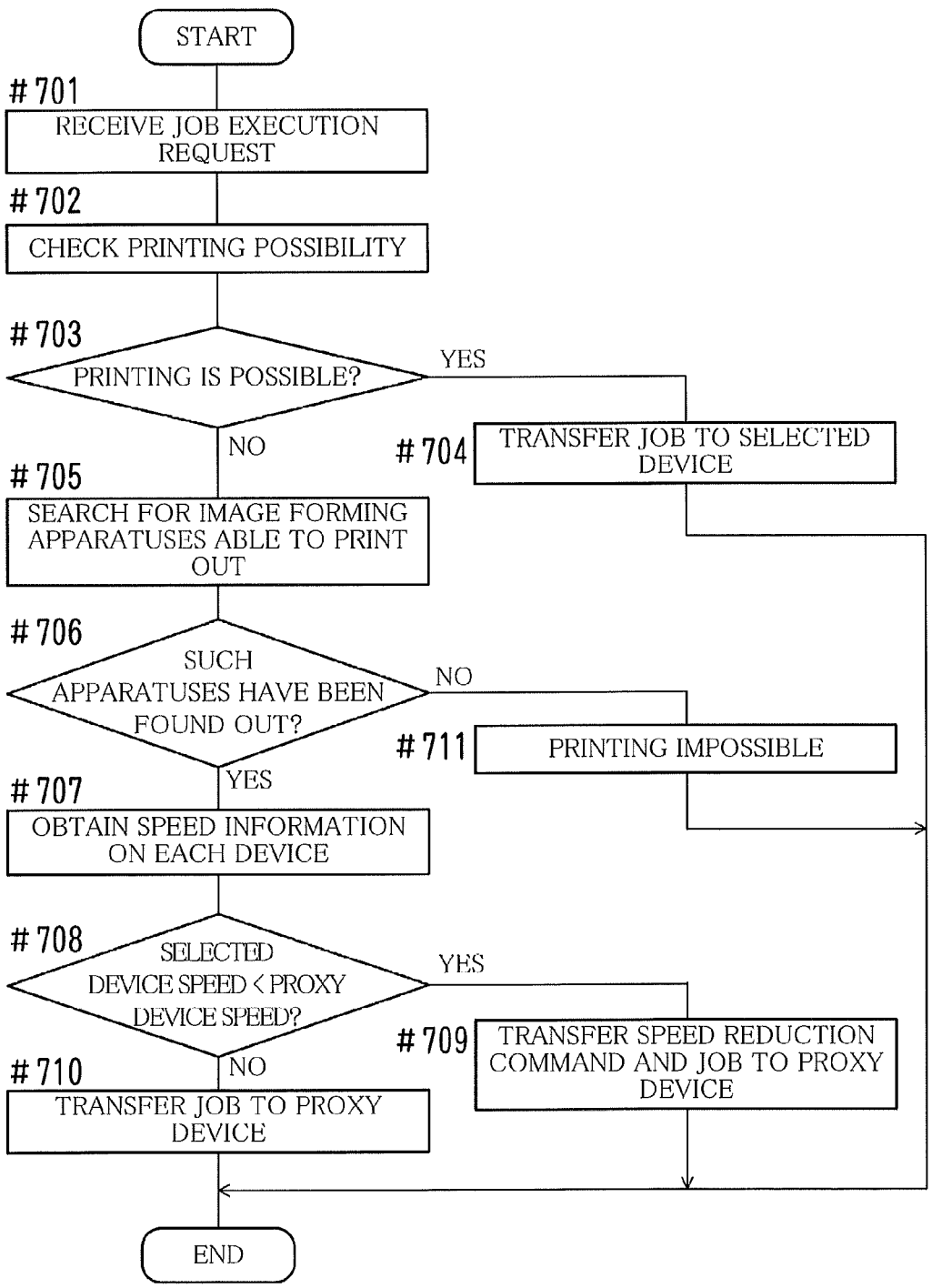
FIG. 21 is a flowchart depicting an example of the flow of the overall processing performed by a remote management device.

FIG. 21 is a flowchart depicting an example of the flow of the overall processing performed by the remote management device 1.

Next, the flow of the overall processing performed by the remote management device 1 and the image forming apparatus 2 is described with reference to the flowchart of FIG. 21.

Referring to FIG. 21, upon the receipt of the print data 8A and the attribute data 8B from the terminal 3 (Step #701), the remote management device 1 checks whether or not the image forming apparatus 2 indicated in the attribute data 8B is currently ready to perform printing (Step #702).

If the image forming apparatus 2 is currently ready to perform printing (Yes in Step #703), then the remote management device 1 transfers, to the image forming apparatus 2, the print data 8A and the attribute data 8B to cause the same to execute a print job (Step #704).

If the image forming apparatus 2 is not currently ready to perform printing (No in Step #703), then the remote management device 1 searches for other image forming apparatuses 2 that can serve as a proxy for the image forming apparatus 2, and selects one from among the other image forming apparatuses 2 (Step #705). In contrast, when such other image forming apparatuses that can serve as the proxy are not found out by the search (No in Step #706), the remote management device 1 stops a series of processing for the print job (Step #711).

The remote management device 1 inquires of the image forming apparatus 2 indicated in the attribute data 8B and the selected image forming apparatus 2 as to the print speed currently set therein (Yes in Step #706, and Step #707).

If the latter print speed, i.e., the proxy device print speed S6, is higher than the former print speed, i.e., the faulty device print speed S5 (Yes in Step #708), then the remote management device 1 determines that the current print speed should be reduced, and sends the print data 8A and the attribute data 8B to the image forming apparatus 2 selected in Step #705 together with the speed reduction command data 8H (Step #709). In this way, a command to execute the print job in place of the subject image forming apparatus 2 and a command to reduce the print speed are given to the selected image forming apparatus 2. If the proxy device print speed S6 is not higher than the faulty device print speed S5 (No in Step #708), then the remote management device 1 sends the print data 8A and the attribute data 8B without the speed reduction command data 8H to the selected image forming apparatus 2 (Step #710). In this way, only a command to execute, by proxy, the print job is given to the selected image forming apparatus 2.

In the meantime, every time when receiving data from the remote management device 1, the image forming apparatus 2 performs the processing discussed below in accordance with the details of the received data. The basic details of the processing are the same as those shown in FIG. 13 of the second embodiment. In the second embodiment, data such as the print data 8A and the attribute data 8B are received from another image forming apparatus 2 or the terminal 3. In contrast, such data is received from the remote management device 1 in the third embodiment. Further, in the third embodiment, data such as the printing possibility reply data 8D and the print speed data 8G are sent to the remote management device 1 instead of being sent to another image forming apparatus 2.

[Fourth Embodiment]

Figure 24:
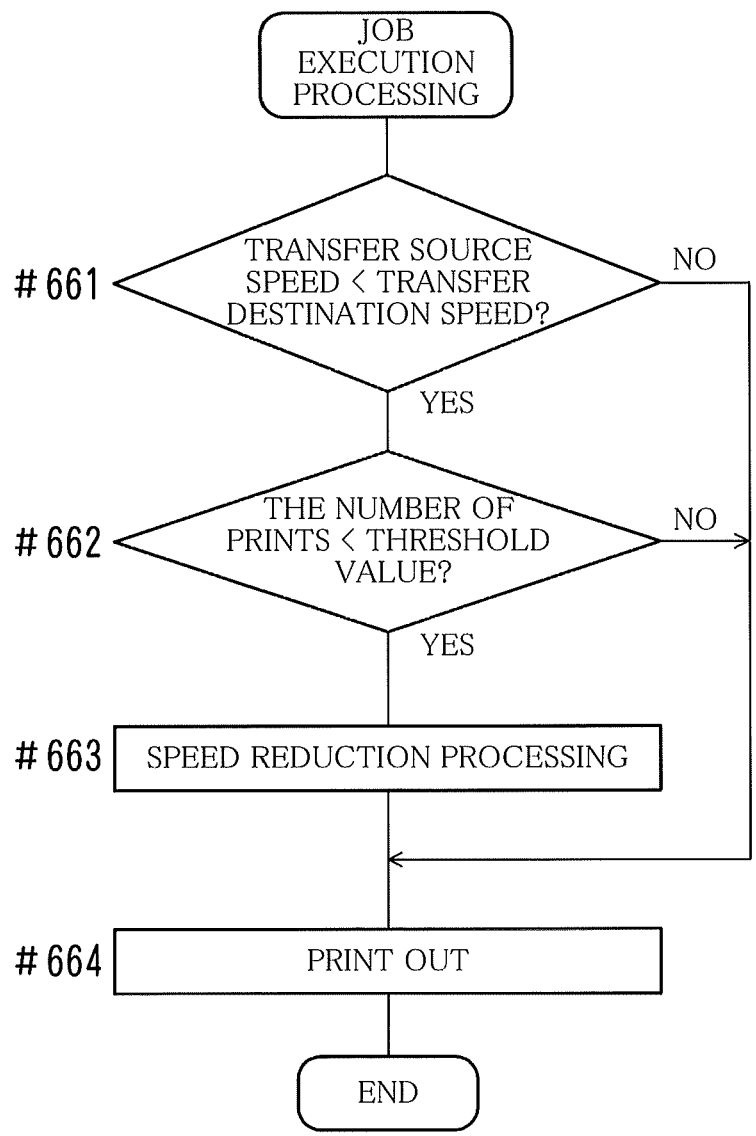
FIG. 24 is a flowchart depicting an example of the flow of job execution processing in a fourth embodiment.

FIGS. 22A and 22B are diagrams showing an example of the specifications of the image forming apparatuses 2A and 2B; FIG. 23 is a diagram showing an example of the total time and the total amount of power required for a print job to be executed depending on the number of prints; FIG. 24 is a flowchart depicting an example of the flow of job execution processing in the fourth embodiment; FIG. 25 is a diagram showing a variation of the specifications of the image forming apparatus 2B; and FIG. 26 is a diagram showing an example of the total time and the total amount of power required for a print job to be executed depending on the number of prints.

In the first through third embodiments, if the print speed currently set in the image forming apparatus 2 which acts as a proxy device to execute a print job, e.g., the image forming apparatus 2B, is higher than the print speed currently set in the image forming apparatus 2 selected by a user, e.g., the image forming apparatus 2A, then the proxy device executes the print job with the print speed reduced regardless of other conditions.

Unlike the first through third embodiments, it is possible that the proxy device executes the print job with the print job reduced in consideration of other conditions. According to the fourth embodiment, the proxy device executes the print job with the print speed reduced when the following conditions are satisfied. The conditions are that the amount of power consumption is lower in the case of reducing the print speed than in the case of not reducing the print speed.

The overall configuration of the network printing system 100 in the fourth embodiment is the same as that in the first embodiment shown in FIG. 1. Likewise, the hardware configuration of the image forming apparatus 2 in the fourth embodiment is the same as that in the first embodiment shown in FIGS. 2 and 3.

However, the speed reduction necessity determining portion 213 shown in FIG. 5 determines whether or not to reduce the print speed in Step #508 of FIG. 6 by using a method different from that of the first embodiment.

The processing for determining whether or not to reduce the print speed in the fourth embodiment is described below by taking an example in which the image forming apparatus 2A is unable to execute a print job due to a trouble, and therefore, the image forming apparatus 2B acts as a proxy to execute the print job for the image forming apparatus 2A.

The speed reduction necessity determining portion 213 of the image forming apparatus 2B calculates a threshold value N based on the following equation (1).

$$\text{Threshold value } N = (\text{amount of preparation power } Wp1 - \text{amount of preparation power } Wp2)/(\text{amount of printing power } Wu2 - \text{amount of printing power } Wu1) \quad (1)$$

Here, the "amount of preparation power Wp1" is an amount of power required to prepare for conditions (environment) under which the image forming apparatus 2B carries out printing at the print speed currently set therein (i.e., proxy device print speed S2). The "amount of printing power Wu1" is an amount of power required for the image forming apparatus 2B to print an image onto one sheet of paper at the proxy device print speed S2. The "amount of preparation power Wp2" is an amount of power required to prepare for an environment under which the image forming apparatus 2B carries out printing at a print speed suitable for the low-speed printing mode (hereinafter, referred to as a "low print speed Sw"). The "amount of printing power Wu2" is an amount of power required for the image forming apparatus 2B to print an image onto one sheet of paper at the low print speed Sw. The preparations involve a process for applying heat to the heat roller 28E (see FIG. 3) and so on to increase the temperature thereof up to a temperature suitable for the print speed, namely, involve warming up the printing unit 20f.

If the proxy device print speed S2 is higher than the faulty device print speed S1, and, at the same time, if the number of sheets to be printed (hereinafter, referred to as "the number of prints M") is smaller than the threshold value N, then the speed reduction necessity determining portion 213 determines that the print speed should be reduced. Otherwise, the speed reduction necessity determining portion 213 determines that it is not necessary to reduce the print speed. The number of prints M can be calculated by multiplying the number of document pages, indicated in the attribute data 8B, and the set of printings together.

Suppose, for example, that the image forming apparatus 2A has the specifications shown in FIG. 22A and the image forming apparatus 2B has the specifications shown in FIG. 22B. The "amount of preparation power" in FIGS. 22A and 22B is an amount of power required for the printing unit 20f to warm up from a sleep mode (power-saving mode). The "amount of printing power" is an amount of power required to print an image onto one sheet of paper.

Suppose that, currently, the image forming apparatus 2A is placed in the low-speed printing mode, the image forming apparatus 2B is placed in the high-speed printing mode, and the printing unit 20fb of the image forming apparatus 2B is put in the sleep mode.

Under the situation, the speed reduction necessity determining portion 213 obtains a determination result as follows.

As clearly shown in FIGS. 22A and 22B, the print speed currently set in the image forming apparatus 2A and the image forming apparatus 2B are "10 ppm (Pages Per Minute)" and "30 ppm", respectively. Thus, the proxy device print speed S2 is higher than the faulty device print speed S1.

The threshold value N is calculated by the following equation: $(8.3-5.8)/(0.40-0.35)=50$ The speed reduction necessity determining portion 213, therefore, determines that the print speed should be reduced if the number of prints M is 40. The speed reduction necessity determining portion 213 determines that it is not necessary to reduce the print speed if the number of prints M is 55. As shown in FIG. 23, when the number of prints M is 40, the amount of power consumption is smaller in the low-speed printing mode than in the high-speed printing mode. On the other hand, when the number of prints M is 55, the amount of power consumption is smaller in the high-speed printing mode than in the low-speed printing mode.

The overall processing performed by the image forming apparatus 2 in the fourth embodiment is basically the same as that in the first embodiment shown in FIG. 7. It is noted, however, that the details of the job execution processing in Step #603 are different between the first embodiment and the fourth embodiment.

Now, the job execution processing in the fourth embodiment is described with reference to the flowchart of FIG. 24.

If the proxy device print speed S2 is higher than the faulty device print speed S1 (Yes in step #661 of FIG. 24), and, at the same time, if the number of prints M is smaller than the threshold value N (Yes in Step #662), then the image forming apparatus 2 determines that the print speed should be reduced, and executes a print job at a print speed suitable for the low-speed printing mode (Step #663 and Step #664). Otherwise (No in Step #661 or No in Step #662), the image forming apparatus 2 executes a print job with the current print speed unchanged (Step #664).

The determination method may be used for the determination as to whether or not to reduce the print speed in Step #529 (see FIG. 12) of the second embodiment, and in Step #551 (see FIG. 20) of the third embodiment.

In the meantime, the image forming apparatus 2 serving as a proxy to execute a print job sometimes has at least three modes for print speed. In such a case, if the proxy device print speed S2 is higher than the faulty device print speed S1, then the image forming apparatus 2 may act as the proxy to execute the print job by reducing the print speed to either one of the proxy device print speed S2 and a print speed lower than the same which has a lower amount of power consumption. The total amount of power consumption includes an amount of power required for preparation and an amount of power required for printing.

When the image forming apparatus 2B has the specifications shown in FIG. 25 and the image forming apparatus 2B executes a print job in place of the image forming apparatus 2A, the print speed of the image forming apparatus 2B is changed in the manner discussed below. Note, however, that the image forming apparatus 2B is currently placed in the high-speed printing mode.

As shown in FIG. 26, when the number of prints M is 2, the total amount of power consumption is the lowest in printing at a print speed of 10 ppm. The image forming apparatus 2B thus reduces the print speed to 10 ppm to execute the print job in place of the image forming apparatus 2A. The same is similarly applied to the case where the number of prints M is 5. When the number of prints M is 40, the total amount of power consumption is the lowest in printing at a print speed of 30 ppm. The image forming apparatus 2B thus reduces the print speed to 30 ppm to execute the print job in place of the image forming apparatus 2A. When the number of prints M is 55, the total amount of power consumption is the lowest in printing at a print speed of 60 ppm. The image forming apparatus 2B thus executes the print job in place of the image forming apparatus 2A with a print speed of 60 ppm unchanged.

In the foregoing embodiments of the present invention, it is possible to reduce power consumed in a printer which serves as a proxy to perform printing for another device. To be specific, even when the image forming apparatus 2 selected by a user who takes account of power saving is unable to perform printing, another image forming apparatus 2 serving as a proxy to perform printing can save power. In particular, when the user intentionally selects an image forming apparatus 2 having a low print speed, the power consumed therein can be saved in light of the user's intention.

[Modification]

In the first through fourth embodiments, the remote management device 1 or the image forming apparatus 2 inquires of other image forming apparatuses 2 whether or not to be currently ready to perform printing, and inquires of them as to the print speed currently set therein at different times. Instead of this, however, the remote management device 1 or the image forming apparatus 2 may make such inquires to the other image forming apparatuses 2 at the same time.

In the first through fourth embodiments, the remote management device 1 or the image forming apparatus 2 inquires of other image forming apparatuses 2 whether or not to be currently ready to perform printing, and inquires of them as to the print speed currently set therein at a time when such information is necessary. However, the following arrangement is possible. Independent of whether or not such inquiries are received, other image forming apparatuses 2 may provide the remote management device 1 or the image forming apparatus 2 with such information at a time when such information details are changed. In short, so-called push technology may be used. In such a case, the remote management device 1 or the image forming apparatus 2 preferably determines whether or not to reduce the print speed based on the updated information.

In the fourth embodiment, FIG. 25 shows an amount of preparation power required for the printing unit 20f to warm up from the sleep mode (power-saving mode). The amount of preparation power changes depending on a temperature of the printing unit 20f. However, a certain correspondence relationship is established between the amount of preparation power and the temperature of the printing unit 20f. In view of this, a table or function showing the correspondence relationship therebetween may be prepared in advance. Then, the threshold value N may be calculated by determining the amount of preparation power based on the current temperature of the printing unit 20f. Likewise, the threshold value N may be calculated by changing the amount of power required to print an image onto one sheet of paper appropriately depending on environment.

In the meantime, when an image forming apparatus 2 acting as a proxy to execute a print job is ready to perform printing in the high-speed printing mode (for example, the heat roller 28E and so on are warmed enough), it is possible to determine that reducing the print speed is unnecessary without performing operation using the equation (1).

It is to be understood that the configurations of the network printing systems 100 and 100', the remote management device 1, and the image forming apparatus 2, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A printer control device for performing control such that a second printer serves as a proxy to execute a print job to be executed by a first printer, the printer control device comprising:
    a speed determination portion configured to determine whether or not a second speed is higher than a first speed, the second speed being a print speed set in the second printer, the first speed being a print speed set in the first printer; and
    a control unit configured to control, when the speed determination portion determines that the second speed is higher than the first speed, the second printer to execute the print job at a third speed lower than the second speed.

2. The printer control device according to claim 1, wherein the control unit controls the second printer to execute the print job at the third speed when low-speed printing power consumption is smaller than high-speed printing power consumption, the low-speed printing power consumption being an amount of power to be consumed for a case where the second printer executes the print job at the third speed, the high-speed printing power consumption being an amount of power to be consumed for a case where the second printer executes the print job at the second speed.

3. The printer control device according to claim 2, wherein
    the high-speed printing power consumption includes the amount of power consumed in order to prepare for conditions under which the second printer performs printing at the second speed, and the amount of power calculated by multiplying the amount of power consumed for the second printer to perform printing on a sheet of paper at the second speed and a number of prints together, and
    the low-speed printing power consumption includes the amount of power consumed in order to prepare for conditions under which the second printer performs printing at the third speed, and the amount of power calculated by multiplying the amount of power consumed for the second printer to perform printing on a sheet of paper at the third speed and a number of prints together.

4. The printer control device according to claim 2, wherein, when there is a plurality of settable speeds that can be set as the third speed in the second printer, the control unit calculates the low-speed printing power consumption for each of the plurality of settable speeds, and controls the second printer to execute the print job by applying, as the third speed, a settable speed of the plurality of settable speeds having a lowest low-speed printing power consumption.

5. The printer control device according to claim 1, wherein
    the first printer and the printer control device are provided in one casing, and
    the control unit controls the second printer to execute the print job by sending job data for executing the print job to the second printer via a communication line.

6. The printer control device according to claim 1, wherein
    the second printer and the printer control device are provided in one casing, and
    the control unit controls the second printer to execute the print job by using job data received from the first printer via a communication line.

7. The printer control device according to claim 1, further comprising a printing possibility determination portion configured to determine whether or not the first printer is ready to perform printing based on status data received from the first printer via a communication line, the status data indicating a status of the first printer;

wherein, when the printing possibility determination portion determines that the first printer is not ready to perform printing, the control unit controls the second printer to execute the print job by sending job data for executing the print job to the second printer via the communication line.

8. A printing proxy control method for performing control such that a second printer serves as a proxy to execute a print job given to a first printer, the printing proxy control method comprising:

determining whether or not a second speed is higher than a first speed, the second speed being a print speed set in the second printer, the first speed being a print speed set in the first printer; and controlling, when it is determined that the second speed is higher than the first speed, the second printer to execute the print job at a third speed lower than the second speed.

9. The printing proxy control method according to claim 8, wherein the second printer is so controlled to execute the print job at the third speed when low-speed printing power consumption is smaller than high-speed printing power consumption, the low-speed printing power consumption being an amount of power to be consumed for a case where the second printer executes the print job at the third speed, the high-speed printing power consumption being an amount of power to be consumed for a case where the second printer executes the print job at the second speed.

10. The printing proxy control method according to claim 9, wherein the high-speed printing power consumption includes the amount of power consumed in order to prepare for conditions under which the second printer performs printing at the second speed, and an amount of power calculated by multiplying the amount of power consumed for the second printer to perform printing on a sheet of paper at the second speed and a number of prints together, and the low-speed printing power consumption includes the amount of power consumed in order to prepare for conditions under which the second printer performs printing at the third speed, and the amount of power calculated by multiplying the amount of power consumed for the second printer to perform printing on a sheet of paper at the third speed and a number of prints together.

11. The printing proxy control method according to claim 9, wherein, when there is a plurality of settable speeds that can be set as the third speed in the second printer, the low-speed printing power consumption is calculated for each of the plurality of settable speeds, and the second printer is so controlled to execute the print job by applying, as the third speed, a settable speed of the plurality of settable speeds having a lowest low-speed printing power consumption.

12. A non-transitory computer-readable storage medium storing thereon a computer program used in a computer for performing control such that a second printer serves as a proxy to execute a print job given to a first printer, the computer program causing the computer to perform processes comprising:

a determination process for determining whether or not a second speed is higher than a first speed, the second speed being a print speed set in the second printer, the first speed being a print speed set in the first printer; and a control process for controlling, when it is determined that the second speed is higher than the first speed, the second printer to execute the print job at a third speed lower than the second speed.

13. The non-transitory computer-readable storage medium according to claim 12, wherein the computer is caused to perform the control process when low-speed printing power consumption is smaller than high-speed printing power consumption, the low-speed printing power consumption being an amount of power to be consumed for a case where the second printer executes the print job at the third speed, the high-speed printing power consumption being an amount of power to be consumed for a case where the second printer executes the print job at the second speed.

14. The non-transitory computer-readable storage medium according to claim 13, wherein the high-speed printing power consumption includes the amount of power consumed in order to prepare for conditions under which the second printer performs printing at the second speed, and amount of power calculated by multiplying the amount of power consumed for the second printer to perform printing on a sheet of paper at the second speed and a number of prints together, and the low-speed printing power consumption includes the amount of power consumed in order to prepare for conditions under which the second printer performs printing at the third speed, and the amount of power calculated by multiplying the amount of power consumed for the second printer to perform printing on a sheet of paper at the third speed and a number of prints together.

15. The non-transitory computer-readable storage medium according to claim 13, wherein, when there is a plurality of settable speeds that can be set as the third speed in the second printer, the computer is caused to perform the control process in such a manner that the low-speed printing power consumption is calculated for each of the plurality of settable speeds, and that the print job is executed by applying, as the third speed, a settable speed of the plurality of settable speeds having a lowest low-speed printing power consumption.

* * * * *